United States Patent [19]
Kato et al.

[11] Patent Number: 6,090,909
[45] Date of Patent: Jul. 18, 2000

[54] UV-RAY-DIMERIZED HIGH MOLECULAR COMPOUND, LIQUID CRYSTAL ALIGNING FILM USING ABOVE HIGH MOLECULAR COMPOUND AND LIQUID CRYSTAL DISPLAY ELEMENT USING ABOVE ALIGNING FILM

[75] Inventors: Takashi Kato; Nobuyuki Otsuka; Hideo Sato, all of Kanagawa; Shizuo Murata, Chiba, all of Japan

[73] Assignee: Chisso Corporation, Osaka, Japan

[21] Appl. No.: 09/244,977

[22] Filed: Feb. 4, 1999

[30] Foreign Application Priority Data

Feb. 19, 1998 [JP] Japan ................................ 10-054470

[51] Int. Cl.⁷ ........................ C08G 69/26; C08G 69/42; C08G 73/00; C08G 75/00
[52] U.S. Cl. ...................... 528/353; 528/170; 528/174; 528/352
[58] Field of Search .................... 528/352, 353, 528/170, 174

[56] References Cited

U.S. PATENT DOCUMENTS 5,206,338  4/1993  Barthelemy .......................... 528/322
5,644,016  7/1997  Roschert et al. ...................... 528/170
5,945,503  8/1999  Takuma et al. ....................... 528/170

FOREIGN PATENT DOCUMENTS 51-13198   of 0000   Japan.
8-254701  10/1996   Japan.

OTHER PUBLICATIONS

"Surface–Induced Parallel Alignment of Liquid Crystals by Linearly Polymerized Photopolymers", M. Schadt et al., Jpn. J. Appl. Phys. vol. 31 (1992), Part 1, No. 7, Jul. 1992 pp. 2155–2164.

Primary Examiner—C. H. Kelly
Attorney, Agent, or Firm—McDermott, Will & Emery

[57] ABSTRACT

Disclosed is an aligning film having good liquid crystal orientation, which can be obtained by irradiating polyimide comprising N-(2-(3,5-diaminobenzoyl)oxyethyl)-α-phenylmaleimide and 1,2,3,4-cyclobutanetetracarboxylic dihydride with polarized UV-rays without employing such methods as rubbing treatment and oblique deposition.

2 Claims, No Drawings

UV-RAY-DIMERIZED HIGH MOLECULAR COMPOUND, LIQUID CRYSTAL ALIGNING FILM USING ABOVE HIGH MOLECULAR COMPOUND AND LIQUID CRYSTAL DISPLAY ELEMENT USING ABOVE ALIGNING FILM

BACKGROUND OF THE INVENTION

1. Field of the Invention

The present invention relates to an optically dimerized high molecular compound, a liquid crystal aligning film using the same and a liquid crystal display element using the above aligning film.

2. Description of the Related Art

In recent years, displays used for word processors and personal computers are requested to be lighter and thinner and consume less power, and an excellent liquid crystal display element is expected to be developed as a flat display satisfying these requisites.

A liquid display element is provided thereon with a liquid crystal orientation film in which a suitable pre-tilt angle is set up in order to orient liquid crystal molecules to a fixed direction. Known as a method for producing these aligning films are rubbing treatment in which a high molecular compound thin film of polyimide formed on a substrate is rubbed with a cloth of rayon in one direction and a method in which silicon dioxide is obliquely deposited.

However, while the rubbing treatment is widely used in an industrial scale since it is a simple and inexpensive method, it involves such problem as production of dusts and generation of static electricity.

Further, in the method using oblique deposition, the production cost is high, and therefore it has been difficult to expand the scale to a larger one.

Accordingly, in recent years, attentions are paid to a method in which orientation treatment with light is carried out in order to solve such problems. In a process of producing an aligning film by this optical orientation method, a thin film of a photo-sensitive high molecular compound is formed on a substrate and irradiated with polarized UV-rays or laser beam, and then only photo-sensitive groups having the same directions as those of the polarized rays irradiated are subjected to photochemical reaction to cause anisotropy on the aligning film, so that the liquid crystal molecules are oriented. This method has the advantage that generation of static electricity and mixing of impurities are avoided since other members do not contact a thin film applied on a substrate.

Disclosed are several optically aligning films obtained by using photo-dimerization brought about by irradiation of polyvinylcinnamate and derivatives thereof including M. Schadt et al, Jpn. J. Appl. Phys., 31, 2155 (1992). However, these aligning films have had the defect that they are low in heat stability and shape-holding ability, so that the liquid crystal is liable to be oriented in disorder.

The present inventors disclosed in Japanese Patent Application Laid-Open No. Hei 8-254701 that an optically aligning film using polyvinyl-4-(4-fluorobenzyl)cinnamate was improved in shape-holding ability and heat stability and showed good liquid crystal orientation, but the sensitivity was not necessarily satisfactory, and irradiation with light for long time was required.

On the other hand, a polymer having an arylmaleimide residue as a photo-sensitive group having a high sensitivity on a side position is disclosed in Japanese Patent Publication No. Sho 51-13198, but application examples thereof to an aligning film for a liquid crystal display element are not found therein.

SUMMARY OF THE INVENTION

Intensive investigations continued by the present inventors have resulted in finding that a high molecular compound having an α, β-substituted maleimide residue on a side position has a high sensitivity and is quickly optically dimerized at a side position and that the film obtained after cross-linking is excellent in heat stability and shape-holding ability and shows good liquid crystal orientation, and thus completing the present invention.

That is, the present invention comprises the following constitutions;

(1) A high molecular compound having a structure represented by a formula [1]:

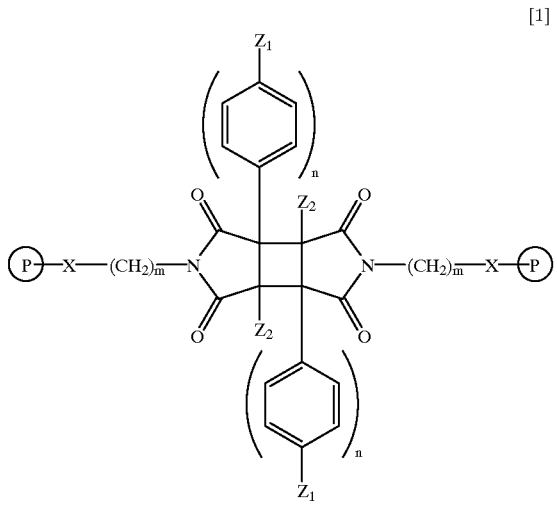

wherein respective P's represent independently a high molecular chain having a weight-average molecular weight of 1,000 to 500,000; respective X's represent independently a single bond, —COO—, —OCO—, —NHCO—, —CONH—, —O—, —S— and —CO—; respective $Z_1$'s and $Z_2$'s represent independently a hydrogen atom, a fluorine atom, a chlorine atom, a cyano group, a nitro group, an alkyl group, a haloalkyl group, an alkoxy group or a haloalkoxy group each having 1 to 12 carbon atoms, a cycloalkyl group having 3 to 9 carbon atoms or a trans-4-alkylcyclohexyl group having 7 to 11 carbon atoms; m is an integer of 1 to 20; and n is an integer of 0 to 3.

(2) A high molecular compound having a structure represented by a formula [2]:

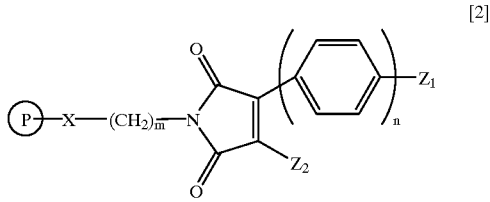

wherein respective P's represent independently a high molecular chain having a weight-average molecular weight of 1,000 to 500,000; respective X's represent independently a single bond, —COO—, —OCO—, —NHCO—, —CONH—, —O—, —S— and —CO—; respective $Z_1$'s and $Z_2$'s represent independently a hydrogen atom, a fluorine atom, a chlorine atom, a cyano group, a nitro group, an alkyl group, a haloalkyl group, an alkoxy group or a haloalkoxy group each having 1 to 12 carbon atoms, a cycloalkyl group having 3 to 9 carbon atoms or a trans-4-alkylcyclohexyl group having 7 to 11 carbon atoms; m is an integer of 1 to 20; and n is an integer of 0 to 3.

(3) An aligning film for a liquid crystal display element using the high molecular compound as described in the item (1).

(4) An aligning film for a liquid crystal display element obtained by irradiating the thin film of the high molecular compound as described in the item (2) with polarized UV-rays to optically dimerize a part of the high molecular compound.

(5) An aligning film for a liquid crystal display element obtained by subjecting the thin film of the high molecular compound as described in the item (2) to heat treatment at 50 to 250° C. and then irradiating the above thin film with polarized UV-rays to optically dimerize a part of the high molecular compound.

(6) A liquid crystal display element provided with the aligning film for a liquid crystal display element as described in the items (3) to (5).

(7) The liquid crystal display element as described in the item (6), wherein the liquid crystal composition contains at least one compound selected from a compound group comprising compounds represented by formulas [3], [4] and [5]:

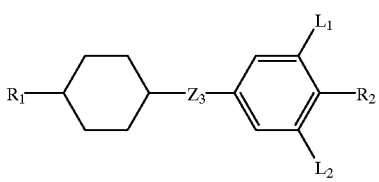

[3]

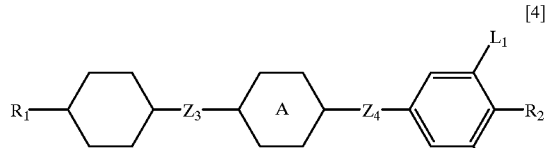

[4]

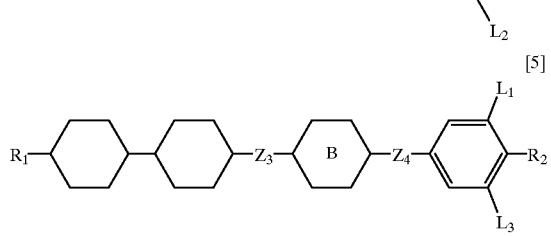

[5]

wherein $R_1$ represents an alkyl group having 1 to 10 carbon atoms, in which optional methylene groups which are not adjacent to each other may be substituted with —O— or —CH=CH— and optional hydrogen atoms may be substituted with fluorine atoms; $R_2$ represents a fluorine atom, a chlorine atom, —OCF$_3$, —OCF$_2$H, —CF$_3$, —CF$_2$H, —CFH$_2$, —OCF$_2$CF$_2$H or —OCF$_2$CFHCF$_3$; $L_1$ and $L_2$ represent independently a hydrogen atom or a fluorine atom; $Z_3$ and $Z_4$ represent independently 1,2-ethylene, 1,4-butylene, —COO—, —CF$_2$O—, —OCF$_2$—, —CH=CH— or a single bond; a ring A represents trans-1,4-cyclohexylene, 1,3-dioxane-2, 5-diyl or 1,4-phenylene in which a hydrogen atom may be substituted with a fluorine atom; a ring B represents trans-1,4-cyclohexylene or 1,4-phenylene in which a hydrogen atom may be substituted with a fluorine atom; and atoms constituting these compounds may be substituted with isotopes thereof.

(8) The liquid crystal display element as described in the item (6), wherein the liquid crystal composition contains at least one compound selected from a compound group comprising compounds represented by formulas [6] and [7]:

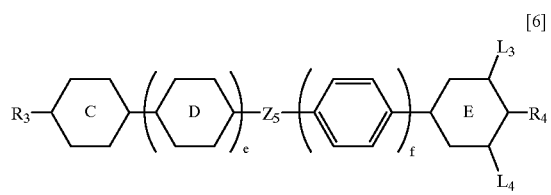

[6]

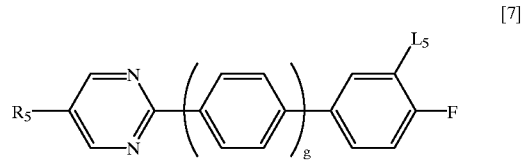

[7]

wherein $R_3$ and $R_5$ represent independently an alkyl group having 1 to 10 carbon atoms, in which optional methylene groups which are not adjacent to each other may be substituted with —O— or —CH=CH— and optional hydrogen atoms may be substituted with fluorine atoms; $R_4$ represents a —CN group or —C≡C—CN; a ring C represents trans-1,4-cyclohexylene, 1,4-phenylene, 1,3-dioxane-2,5-diyl or pyrimidine-2,5-diyl; a ring D represents trans-1,4-cyclohexylene, 1,4-phenylene in which a hydrogen atom may be substituted with a fluorine atom, or pyrimidine-2,5-diyl; a ring E represents trans-1,4-cyclohexylene or 1,4-phenylene; $Z_5$ represents 1,2-ethylene, —COO— or a single bond; $L_3$, $L_4$ and $L_5$ represent independently a hydrogen atom or a fluorine atom; e, f and g represent independently 0 or 1; and atoms constituting these compounds may be substituted with isotopes thereof.

(9) The liquid crystal display element as described in the item (6), wherein the liquid crystal composition contains at least one compound selected from a compound group comprising compounds represented by formulas [8], [9] and [10]:

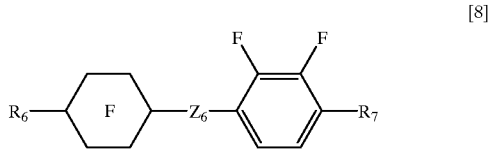

[8]

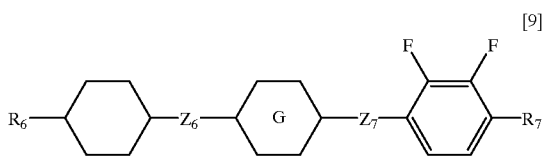

[9]

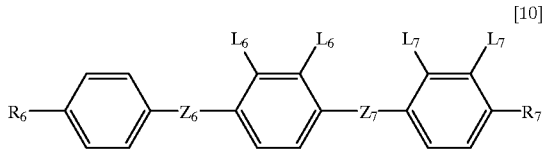

wherein $R_6$ and $R_7$ represent independently an alkyl group having 1 to 10 carbon atoms, in which optional methylene groups which are not adjacent to each other may be substituted with —O— or —CH=CH— and optional hydrogen atoms may be substituted with fluorine atoms; a ring F and a ring G represent independently trans-1,4-cyclohexylene or 1,4-phenylene; $L_6$ and $L_7$ represent independently a hydrogen atom or a fluorine atom but do not represent a hydrogen atom at the same time; $Z_6$ and $Z_7$ represent independently 1,2-ethylene, —COO— or a single bond; and atoms constituting these compounds may be substituted with isotopes thereof.

(10) The liquid crystal display element as described in the item (6), wherein the liquid crystal composition contains at least one compound selected from the compound group comprising the compounds represented by the formulas [3], [4] and [5] described above and at least one compound selected from a compound group comprising compounds represented by formulas [11], [12] and [13] as a second component:

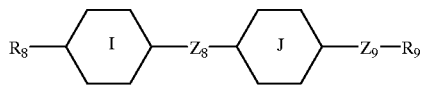

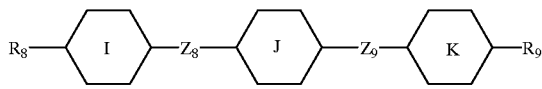

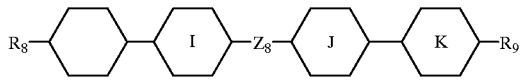

wherein R, and R, represent independently an alkyl group having 1 to 10 carbon atoms, in which optional methylene groups which are not adjacent to each other may be substituted with —O— or —CH=CH— and optional hydrogen atoms may be substituted with fluorine atoms; a ring I, a ring J and a ring K represent independently trans-1,4-cyclohexylene, pyrimidine-2,5-diyl or 1,4-phenylene in which a hydrogen atom may be substituted with a fluorine atom; $Z_8$ and $Z_9$ represent independently 1,2-ethylene, —C≡C—, —COO—, —CH=CH— or a single bond; and atoms constituting these compounds may be substituted with isotopes thereof.

(11) The liquid crystal display element as described in the item (6), wherein the liquid crystal composition contains at least one compound selected from the compound group comprising the compounds represented by the formulas [6] and [7] described above and at least one compound selected from the compound group comprising the compounds represented by the formulas [11], [12] and [13] described above as the second component.

(12) The liquid crystal display element as described in the item (6), wherein the liquid crystal composition contains at least one compound selected from the compound group comprising the compounds represented by the formulas [8], [9] and [10] described above and at least one compound selected from the compound group comprising the compounds represented by the formulas [11], [12] and [13] described above as the second component.

(13) The liquid crystal display element as described in the item (6), wherein the liquid crystal composition contains at least one compound selected from the compound group comprising the compounds represented by the formulas [3], [4] and [5] described above, at least one compound selected from the compound group comprising the compounds represented by the formulas [6] and [7] described above as a second component and at least one compound selected from the compound group comprising the compounds represented by the formulas [11], [12] and [13] described above as a third component.

(14) The liquid crystal display element as described in the items (7) to (13), wherein the liquid crystal composition further contains at least one optically active compound.

DETAILED DESCRIPTION OF THE INVENTION

The aligning film for a liquid crystal display element according to the present invention is produced by removing a solvent after applying on a substrate a solution of a high molecular compound having an α, β-substituted maleimide residue on a side position to form a film and irradiating this thin film with polarized UV-rays to provide the surface of the film with anisotropy.

This can be shown by the following equation:

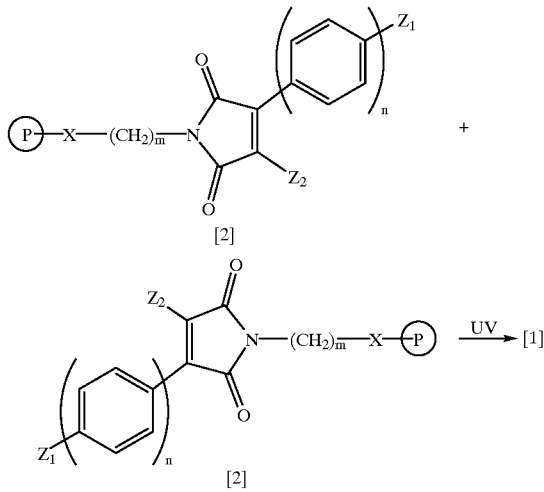

The high molecular compound having an α, β-substituted maleimide residue on a side position represented by the formula [2] can readily be synthesized by conventional organic synthetic methods. That is, they include a method in which a monomer having an α, β-substituted maleimide residue on a side position is synthesized and then the above compound is obtained by polymerization reaction using other reactive groups present in the same molecule while holding the maleimide residue and a method in which the above compound is obtained by high molecular reaction of α, β-substituted maleic anhydride or an α, β-substituted maleimide derivative with a polymer. These methods can freely be selected according to the kind of the linkage X.

This can be shown by the following equation:

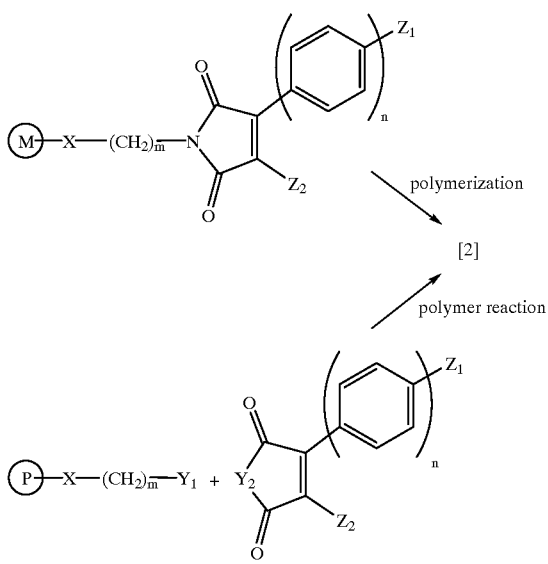

wherein P, X, $Z_1$, $Z_2$, m and n are synonymous with those described previously; M represents a polymerizable functional group; $Y_1$ represents a carboxyl group, a hydroxyl group, an amino group or carboxylic halide; and $Y_2$ represents an oxygen atom, —NH— or —N(CH$_2$)$_m$Y$_3$, in which $Y_3$ represents a halogen atom, sulfonyl ester, a carboxyl group or carboxylic halide.

In the compounds represented by the formulas [1] and [2] used in the present invention, the length m of the spacer is preferably 2 to 12, more preferably 2 to 8. If m is less than 2, the flexibility of the side chain is lost, and the optical dimerization reaction is hard to go on. On the other hand, if m is more than 12, the side chain is too flexible, so that there is the possibility that an adverse effect is exerted on the thermal stability of the film after optical cross-linking.

In the compounds represented by the formulas [1] and [2] in the present invention, the number n of a benzene ring substituted in the a-position of the imide ring is preferably 1 to 2. The number of the ring exceeding this level makes the substituent too stiff and therefore brings about the risk to extremely reduce the solubility and the coating property of the resulting polymer or inhibit the optical dimerization reaction by steric hindrance.

The following atoms and functional groups can specifically be given as the substituents $Z_1$ and $Z_2$ of the compounds represented by the formulas [1] and [2] used in the present invention, but the substituents shall not necessarily be restricted to them. That is, they include atoms or cyclic substitutents such as hydrogen, fluorine, chlorine, a cyano group, a nitro group, cyclopropyl, cyclobutyl, cyclopentyl, methylcyclopropyl, ethylcyclopropyl, propylcyclopropyl, n-butylcyclopropyl, methylcyclobutyl, ethylcyclobutyl, propylcyclobutyl, n-butylcyclobutyl, methylcyclopentyl, ethylcyclopentyl, propylcyclopentyl and n-butylcyclopentyl.

The trans-4-alkylcyclohexyl group includes trans-4-methylcyclohexyl, trans-4-ethylcyclohexyl, trans-4-propylcyclohexyl, trans-4-butylcyclohexyl and trans-4-pentylcyclohexyl.

The alkyl group includes methyl, ethyl, n-propyl, iso-propyl, n-butyl, iso-butyl, sec-butyl, t-butyl, n-pentyl, iso-pentyl, neo-pentyl, t-pentyl, n-hexyl, iso-hexyl, heptyl, octyl, nonyl, decyl, undecyl and dodecyl.

The haloalkyl group includes trifluoromethyl, trichloromethyl, tribromomethyl, triiodomethyl, pentafluoroethyl, pentachloroethyl, pentabromoethyl, pentaiodoethyl, 1,1,1-trichloroethyl, 1,1,1-trifluoroethyl, 1,1,1-tribromoethyl, 1,1,1-triiodoethyl, heptafluoropropyl, heptachloropropyl, heptabromopropyl, heptaiodopropyl, 1,1,1-trifluoropropyl, 1,1,1-trichloropropyl, 1,1,1-tribromopropyl, 1,1,1-triiodopropyl, nonafluorobutyl, nonachlorobutyl, nonabromobutyl, nonaiodobutyl, perfluoropentyl, perchloropentyl, perbromopentyl, perfluorohexyl, perchlorohexyl, perbromohexyl, periodohexyl, perfluoroheptyl, perchloroheptyl, perbromoheptyl, perfluorooctyl, perchlorooctyl, perbromooctyl, perfluorononyl, perchlorononyl, perbromononyl, perfluorodecyl, perchlorodecyl and perbromodecyl.

The alkoxy group and the haloalkoxy group include methoxy, ethoxy, n-propoxy, iso-propoxy, n-butoxy, iso-butoxy, sec-butoxy, t-butoxy, n-pentyloxy, iso-pentyloxy, neo-pentyloxy, t-pentyloxy, n-hexyloxy, iso-hexyloxy, heptyloxy, octyloxy, nonyloxy, decyloxy, undecyloxy, dodecyloxy, trifluoromethoxy, trichloromethoxy, tribromomethoxy, triiodomethoxy, pentafluoroethoxy, pentachloroethoxy, pentabromoethoxy, pentaiodoethoxy, 1,1,1-trichloroethoxy, 1,1,1-trifluoroethoxy, 1,1,1-tribromoethoxy, 1,1,1-triiodoethoxy, heptafluoropropoxy, heptachloropropoxy, heptabromopropoxy, heptaiodopropoxy, 1,1,1-trifluoropropoxy, 1,1,1-trichloropropoxy, 1,1,1-tribromopropoxy, 1,1,1-triiodopropoxy, nonafluorobutoxy, nonachlorobutoxy, nonabromobutoxy, nonaiodobutoxy, perfluoropentyloxy, perchloropentyloxy, perbromopentyloxy, perfluorohexyloxy, perchlorohexyloxy, perbromohexyloxy, periodohexyloxy, perfluoroheptyloxy, perchloroheptyloxy, perbromoheptyloxy, perfluorooctyloxy, perchlorooctyloxy, perbromooctyloxy, perfluorononyloxy, perchlorononyloxy, perbromononyloxy, perfluorodecyloxy, perchlorodecyloxy and perbromodecyloxy.

Among the substituents described above, preferred are hydrogen, fluorine, a cyano group, methyl, ethyl, n-propyl, n-butyl, n-pentyl, n-hexyl, heptyl, octyl, nonyl, decyl, undecyl, dodecyl, heptafluoropropyl, nonafluorobutyl, perfluoropentyl, perfluorohexyl, perfluoroheptyl, perfluorooctyl, perfluorononyl, perfluorodecyl, methoxy, ethoxy, n-propoxy, n-butoxy, n-pentyloxy, n-hexyloxy, heptyloxy, octyloxy, nonyloxy, decyloxy, undecyloxy, dodecyloxy, heptafluoropropoxy, nonafluorobutoxy, perfluoropentyloxy, perfluorohexyloxy, perfluoroheptyloxy, perfluorooctyloxy, perfluorononyloxy and perfluorodecyloxy. More preferred are hydrogen, fluorine, a cyano group, n-propyl, n-butyl, n-pentyl, n-hexyl, heptyl, octyl, nonyl, decyl, undecyl, dodecyl, perfluorohexyl, perfluoroheptyl, perfluorooctyl, perfluorononyl, perfluorodecyl, n-hexyloxy, heptyloxy, octyloxy, nonyloxy, decyloxy, undecyloxy, dodecyloxy, perfluorohexyloxy, perfluoroheptyloxy, perfluorooctyloxy, perfluorononyloxy and perfluorodecyloxy.

In the aligning film for a liquid crystal display element according to the present invention, a part represented by P in the formulas [1] and [2], that is, a high molecular compound capable of being used as a principal chain includes, to be specific, the following polymers. They are, for example, polyethylene, polypropylene, polybutene, polystyrene, poly-α-methylstyrene, polybutadiene, polyisoprene, polynorbornene, polyacetylene, polyphenylene, polyvinyl chloride, polyvinylidene chloride, polyvinylidene fluoride, polytetrafluoroethylene, polyvinyl acetate, polyvinyl alcohol, polyvinyl ether, polyvinyl ketone, poly(meth) acrylonitrile, polymaleimide, polyether, polyether ketone, polyacetal, polyester, polyallylate, polycarbonate, polythiocarbonate, polyamine, polyethyleneimine, polyamide, polypeptide (polyamino acid), polyurethane, polyurea, polyimide, polyimidazole, polyoxazole, polypyrrole, polyaniline, polysulfide, polysulfone, polyphosphine oxide, polyphosphazene, polysiloxane, polysilane, phenol resins and cellulose. These polymers may be used either alone or in the form of a copolymer in the case of copolymerizable combination.

Among the principal chains described above, preferred are polyvinyl acetate, polyvinyl alcohol, polyvinyl ether, poly(meth)acrylonitrile, polymaleimide, polyether, polyether ketone, polyacetal, polyester, polyallylate, polycarbonate, polyamide, polypeptide (polyamino acid), polyurethane, polyimide, polyimidazole, polyoxazole, polysiloxane and polysilane. More preferred are polyvinyl acetate, polyvinyl alcohol, polymaleimide, polyether, polyester, polycarbonate, polyamide, polyimide and polysiloxane. Among them, further more preferred are polycarbonate, polyamide, polyimide and polysiloxane.

These polymers are connected to the photo-sensitive group through the linkage (X in the formula [1] or [2]). Accordingly, if the polymer site and the photo-sensitive group site have functional groups which can react with each other, both sites can be connected by making use of them to connect both. If they do not have such functional groups, the required functional groups are introduced, and then both can be reacted and connected. Examples of the connecting reactions thereof shall briefly be given below based on the kind of X. That is, they can be connected through dehydration reaction of a carboxyl group with a hydroxyl group in the case of an ester bond, dehydration reaction of an amino group with a carboxyl group in the case of an amide bond, sodium salt elimination between sodium alcoholate and halide in the case of an ether bond, dehalogenation by potassium sulfide after converting both to alkyl halides in the case of a sulfide bond, hydrolysis after reacting a cyano group with a Grignard reagent in the case of a carbonyl bond, and dehalogenation between halides in the case of a single bond.

Preferred as a process for producing the aligning film for a liquid crystal display element according to the present invention is a process in which a solution obtained by dissolving the photo-sensitive high molecular compound represented by the formula [2] in a solvent is applied on a substrate and subjected to heat treatment at a temperature of 50 to 250° C. to remove the solvent, whereby a high molecular compound thin film is formed on the substrate.

Solvents used for conventional aligning films for a liquid crystal display element can be used for the photo-sensitive high molecular compound represented by the formula [2] used for the aligning film for a liquid crystal display element according to the present invention. That is, there can be given as examples of the solvents capable of being used for these high molecular compounds, aprotic polar organic solvents which are good solvents (N-methyl-2-pyrrolidone, dimethylimidazolidinone, N-methylcaprolactam, N-methylpropionamide, N,N-dimethylacetamide, dimethylsulfoxide, N,N-dimethylformamide, N,N-diethylformamide, N,N-diethylacetamide, y-butyrolactone and the like) and in addition thereto, other solvents having low surface tensions for the purpose of improving a coating property [alkyl lactate, 3-methyl-3-methoxybutanol, tetralin, isophorone, ethylene glycol monoalkyl ethers (ethylene glycol monobutyl ether and the like), diethylene glycol monoalkyl ethers (diethylene glycol monoethyl ether and the like), ethylene glycol monoalkyl or phenyl acetates, triethylene glycol monoalkyl ethers, propylene glycol monoalkyl ethers (propylene glycol monobutyl ether and the like) and dialkyl malonates (diethyl malonate and the like)]. These solvents act as poor solvents against the preceding good solvents in many cases.

Usually used methods can be used as a method for applying the solution prepared using these solvents on the substrate on which a liquid crystal display element is formed. The solution can be applied by, for example, a spinner method, a printing method, a dipping method and a dropping method.

Further, heat treatment required for drying these solvents after applying these solutions can be carried out by the same methods as those used for conventional aligning films for a liquid crystal display element. The heat treatment can be carried out in, for example, an oven, a hot plate and an infrared oven. After applying the solution, the solvent is evaporated at relatively low temperatures, and then the heat treatment is preferably carried out at a temperature of 150 to 300° C., preferably 180 to 250° C. Surfactants used for the purpose of improving an applying property and anti-static agents used for the purpose of preventing static charge can be added to the high molecular compound solution in the present invention. Further, silane coupling agents and titanium coupling agents can be blended in order to raise the adhesion to the substrate.

Subsequently, this thin film is irradiated with polarized UV-rays to provide the surface of the film with anisotropy. The rays irradiated to an α, β-substituted maleimide group which is a photo-sensitive group used in the aligning film for a liquid display element according to the present invention have a wavelength of preferably 200 to 410 nm, more preferably 300 to 370 nm. The exposure of these polarized UV-rays is 0.05 to 15.0 $J/cm^2$, preferably 0.1 to 10.0 $J/cm^2$ and more preferably 0.1 to 5.0 $J/cm^2$.

In a substrate used for a liquid crystal display element, an electrode, specifically a transparent electrode of ITO (indium oxide-tin oxide) or tin oxide is formed usually on a substrate. Further, an insulating film for preventing elution of alkali from the substrate, a color filter and a protective film such as a color filter overcoat may be provided between this electrode and the substrate, and overcoat films such as an insulating film and a color filter film may be provided on the electrode. Further, active elements such as a TFT (thin-film-transistor) element and an MIM (metal-insulator-metal) element may be formed on the substrate. Conventional structures for a liquid crystal display element can be employed for a structure in the liquid crystal cell such as these electrode and undercoat and others.

The substrate thus formed is used to prepare a cell, which is charged with liquid crystal, and the inlet is sealed, whereby a liquid crystal display element is formed. Various liquid crystals such as liquid crystal containing dichroic dye as well as conventional nematic liquid crystals can be used as the liquid crystal to be filled.

A liquid crystal composition containing at least one compound selected from the compound group comprising the compounds represented by the following formulas [3], [4] and [5] can be given as a specific example of a liquid crystal composition capable of being preferably used in combination with the present aligning film in the present invention:

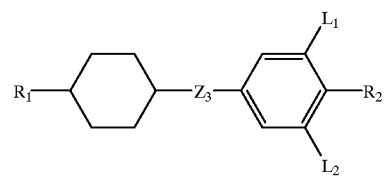
[3]

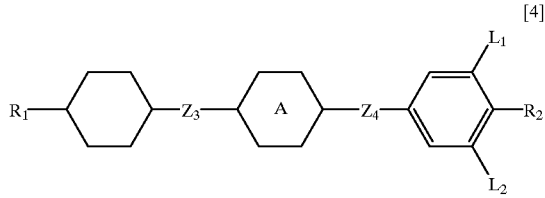
[4]

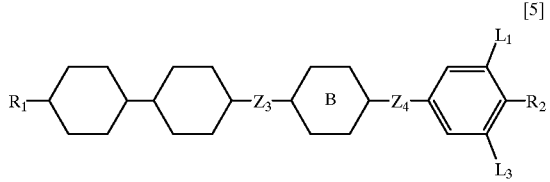
[5]

wherein $R_1$ represents an alkyl group having 1 to 10 carbon atoms, in which optional methylene groups which are not adjacent to each other may be substituted with —O— or —CH=CH— and optional hydrogen atoms may be substituted with fluorine atoms; $R_2$ represents a fluorine atom, a chlorine atom, —OCF$_3$, —OCF$_2$H, —CF$_3$, —CF$_2$H, —CFH$_2$, —OCF$_2$CF$_2$H or —OCF$_2$CFHCF$_3$; $L_1$ and $L_2$ represent independently a hydrogen atom or a fluorine atom; $Z_3$ and $Z_4$ represent independently 1,2-ethylene, 1,4-butylene, —COO—, —CF$_2$O—, —OCF$_2$—, —CH=CH— or a single bond; a ring A represents trans-1,4-cyclohexylene, 1,3-dioxane-2,5-diyl or 1,4-phenylene in which a hydrogen atom may be substituted with a fluorine atom; a ring B represents trans-1,4-cyclohexylene or 1,4-phenylene in which a hydrogen atom may be substituted with a fluorine atom; and atoms constituting these compounds may be substituted with isotopes thereof.

Further, a liquid crystal composition containing at least one compound selected from the compound group comprising the compounds represented by the following formulas [6] and [7] can be given:

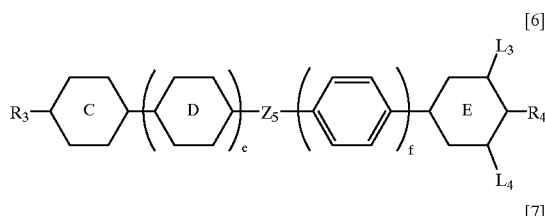
[6]

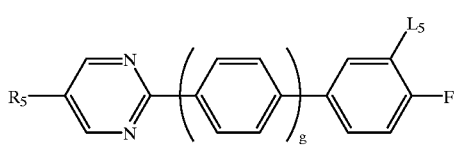
[7]

wherein $R_3$ and $R_4$ represent independently an alkyl group having 1 to 10 carbon atoms, in which optional methylene groups which are not adjacent to each other may be substituted with —O— or —CH=CH— and optional hydrogen atoms may be substituted with fluorine atoms; $R_4$ represents a —CN group or —C≡C—CN; a ring C represents trans-1,4-cyclohexylene, 1,4-phenylene, 1,3-dioxane-2,5-diyl or pyrimidine-2,5-diyl; a ring D represents trans-1,4-cyclohexylene, 1,4-phenylene in which a hydrogen atom may be substituted with a fluorine atom or pyrimidine-2,5-diyl; a ring E represents trans-1,4-cyclohexylene or 1,4-phenylene; $Z_5$ represents 1,2-ethylene, —COO— or a single bond; $L_3$, $L_4$ and $L_5$ represent independently a hydrogen atom or a fluorine atom; e, f and g represent independently 0 or 1; and atoms constituting these compounds may be substituted with isotopes thereof.

In addition, there can be given, a liquid crystal composition containing at least one compound selected from the compound group comprising the compounds represented by the following formulas [8], [9] and [10]:

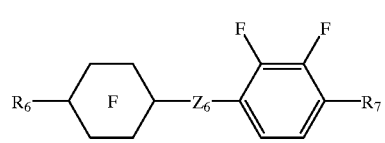
[8]

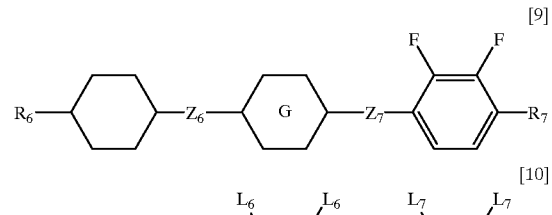
[9]

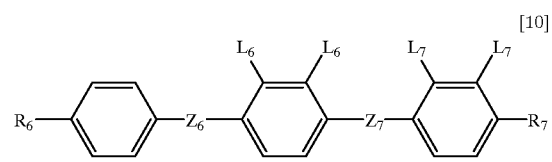
[10]

wherein $R_6$ and $R_7$ represent independently an alkyl group having 1 to 10 carbon atoms, in which optional methylene groups which are not adjacent to each other may be substituted with —O— or —CH=CH— and optional hydrogen atoms may be substituted with fluorine atoms; a ring F and a ring G represent independently trans-1,4-cyclohexylene or 1,4-phenylene; $L_6$ and $L_7$ represent independently a hydrogen atom or a fluorine atom but do not represent a hydrogen atom at the same time; $Z_6$ and $Z_7$ represent independently 1,2-ethylene, —COO— or a single bond; and atoms constituting these compounds may be substituted with isotopes thereof.

Further, there can be given a liquid crystal composition containing at least one compound selected from the compound group comprising the compounds represented by the formulas [3], [4] and [5] described above and at least one compound selected from the compound group comprising the compounds represented by the following formulas [11], [12] and [13] as a second component:

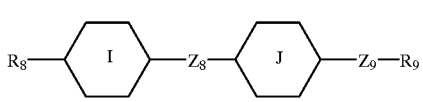
[11]

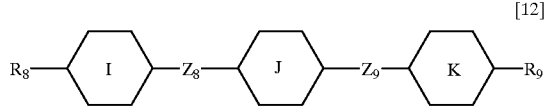
[12]

[13]

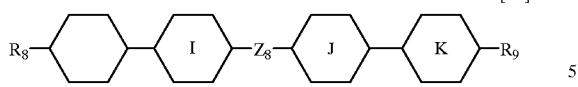

wherein $R_8$ and $R_9$ represent independently an alkyl group having 1 to 10 carbon atoms, in which optional methylene groups which are not adjacent to each other may be substituted with —O— or —CH=CH— and optional hydrogen atoms may be substituted with fluorine atoms; a ring I, a ring J and a ring K represent independently trans-1,4-cyclohexylene, pyrimidine-2,5-diyl or 1,4-phenylene in which a hydrogen atom may be substituted with a fluorine atom; $Z_8$ and $Z_9$ represent independently 1,2-ethylene, —C≡C—, —COO—, —CH=CH— or a single bond; and atoms constituting these compounds may be substituted with isotopes thereof.

Further, there can be given a liquid crystal composition containing at least one compound selected from the compound group comprising the compounds represented by the formulas [6] and [7] described above and at least one compound selected from the compound group comprising the compounds represented by the formulas [11], [12] and [13] described above as the second component.

Still further, there can be given a liquid crystal composition containing at least one compound selected from a compound group comprising the compounds represented by the formulas [8], [9] and [10] described above and at least one compound selected from a compound group comprising compounds represented by the formulas [11], [12] and [13] described above as the second component.

Furthermore, there can be given a liquid crystal composition containing at least one compound selected from the compound group comprising the compounds represented by the formulas [3], [4] and [5] described above, at least one compound selected from the compound group comprising the compounds represented by the formulas [6] and [7] described above as a second component and at least one compound selected from the compound group comprising the compounds represented by the formulas [11], [12] and [13] described above as a third component.

In addition, the liquid crystal compositions described above may further contain at least one optically active compound.

Preferably, compounds represented by formulas (3-1) to (5-53) can be given as the compounds represented by the formulas [3] to [5]:

(3-1) to (3-15)

(3-1)

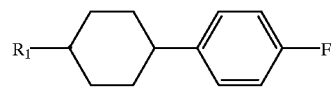

(3-2)

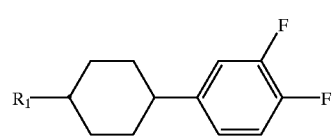

(3-3)

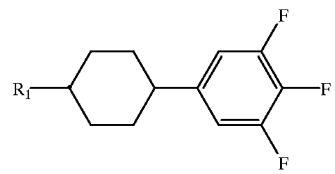

(3-4)

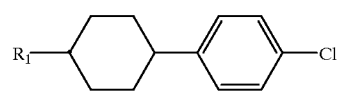

(3-5)

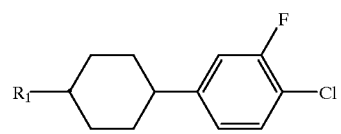

(3-6)

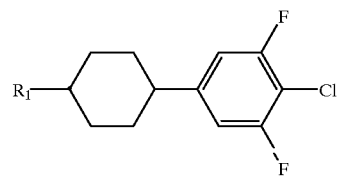

(3-7)

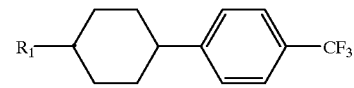

(3-8)

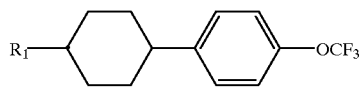

(3-9)

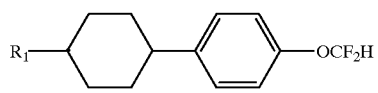

(3-10)

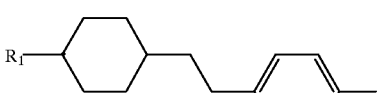

(3-11)

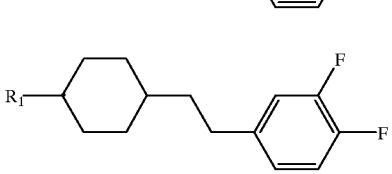

(3-12)

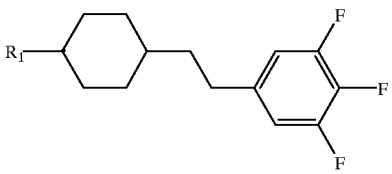

(3-13)

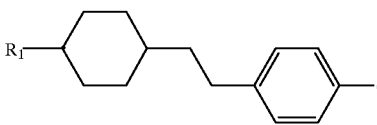

(3-14)
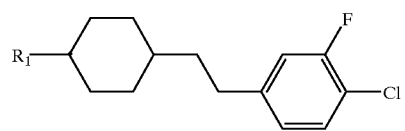
(3-15)
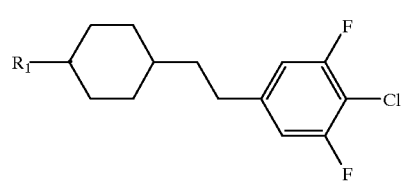
(4-1) to (4-15)
(4-1)
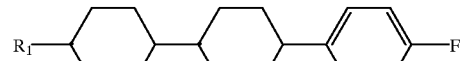
(4-2)
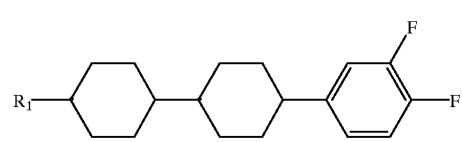
(4-3)
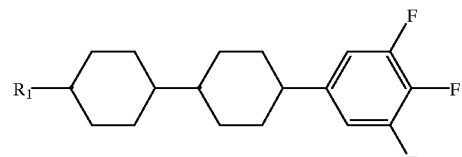
(4-4)
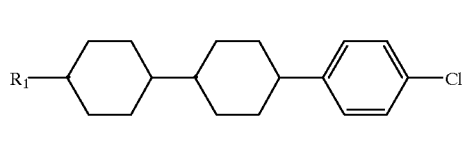
(4-5)
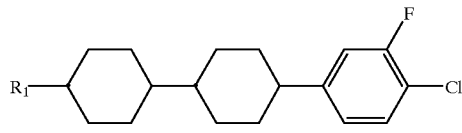
(4-6)
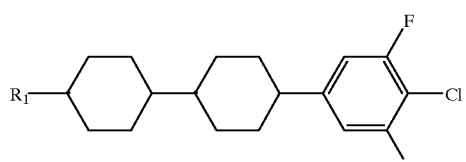
(4-7)
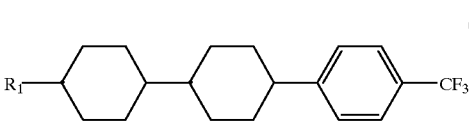
(4-8)
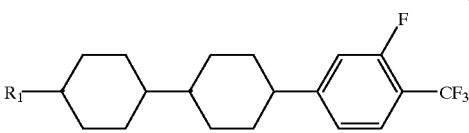
(4-9)
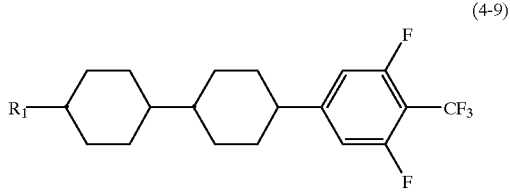
(4-10)
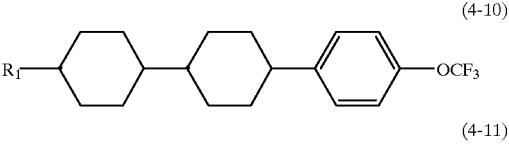
(4-11)
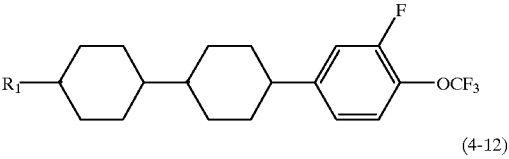
(4-12)
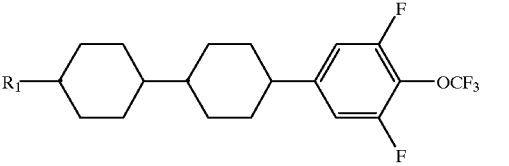
(4-13)
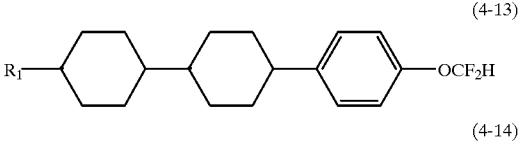
(4-14)
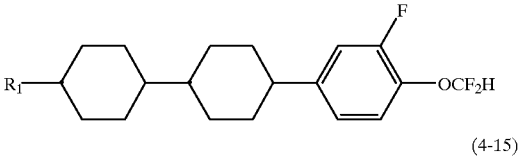
(4-15)
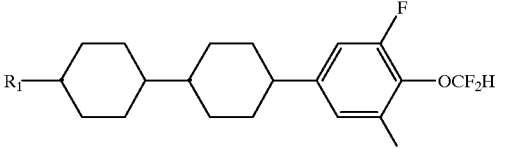
(4-16) to (4-29)
(4-16)
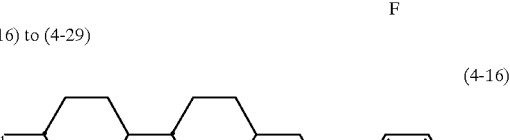
(4-17)
(4-18)
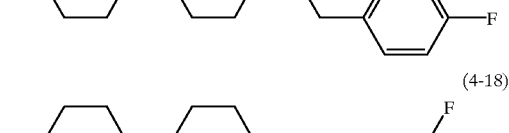
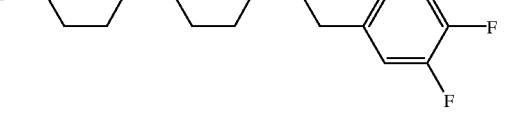

(4-19)
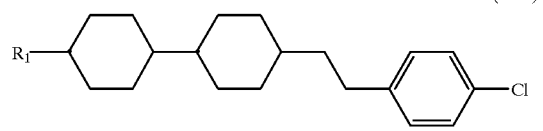
(4-20)
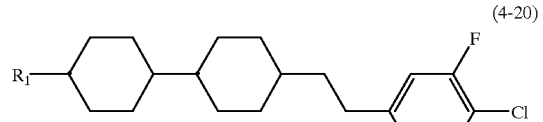
(4-21)
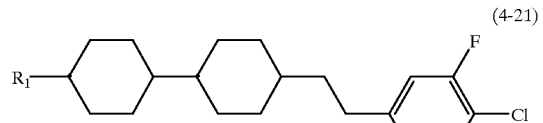
(4-22)
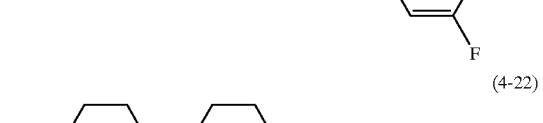
(4-23)
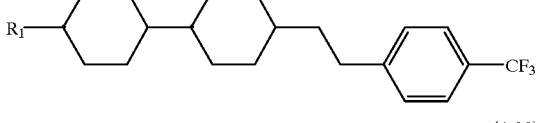
(4-24)
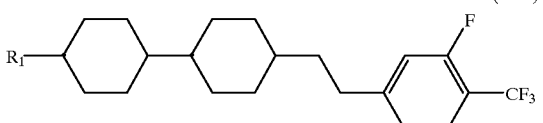
(4-25)
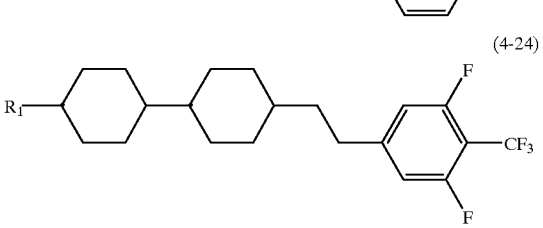
(4-26)
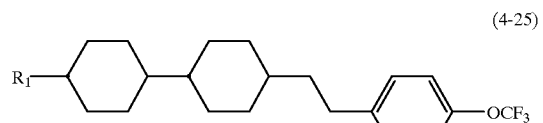
(4-27)
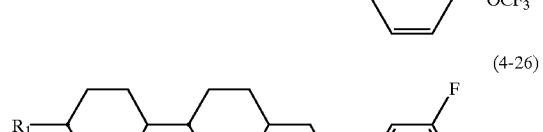
(4-28)
(4-29)
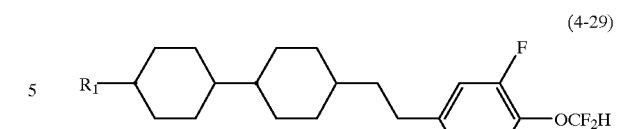
(4-30) to (4-42)
(4-30)
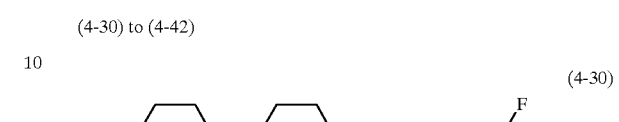
(4-31)
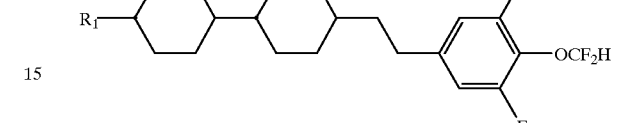
(4-32)
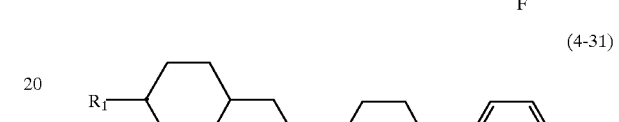
(4-33)
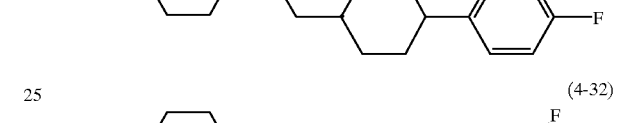
(4-34)
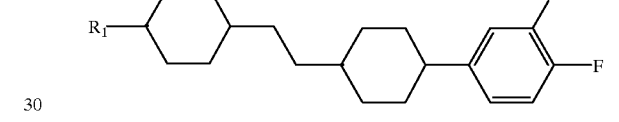
(4-35)
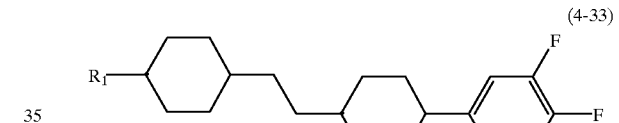
(4-36)
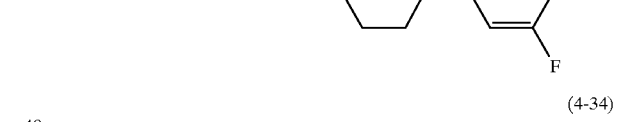
(4-37)
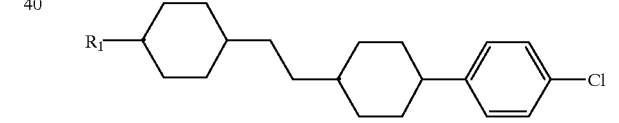
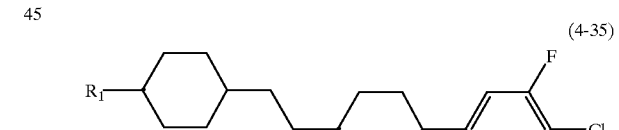

-continued
(4-38)
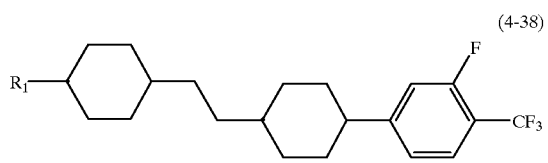
(4-39)
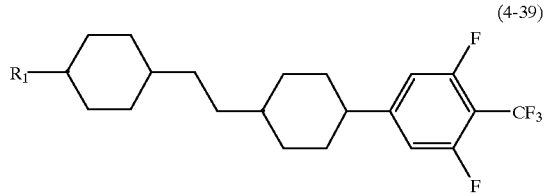
(4-40)
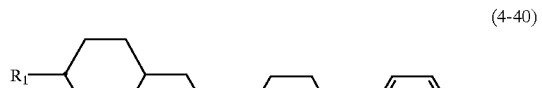
(4-41)
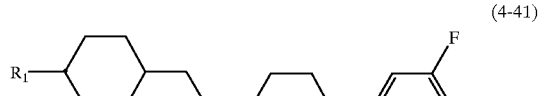
(4-42)
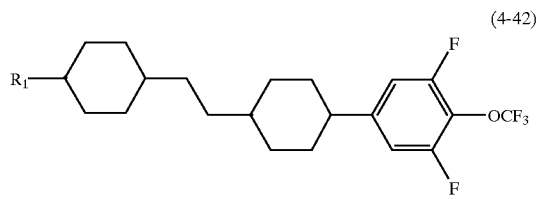
(4-43) to (4-48)
(4-43)
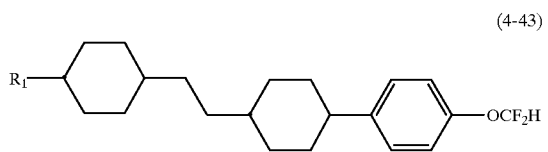
(4-44)
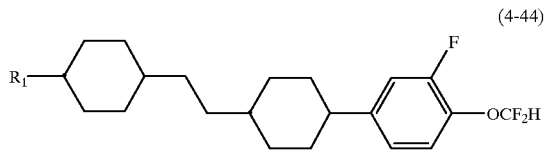
(4-45)
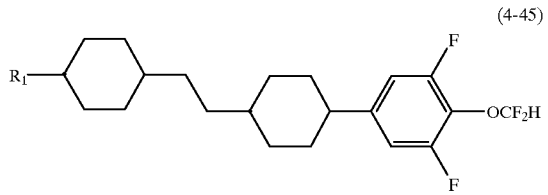
(4-46)
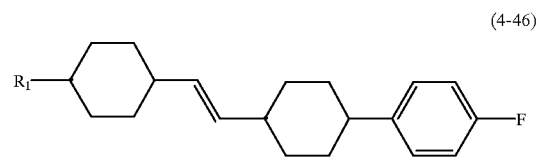
-continued
(4-47)
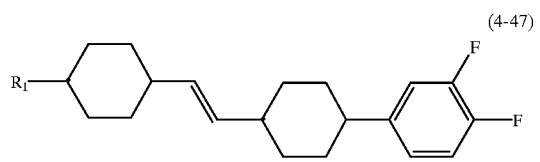
(4-48)
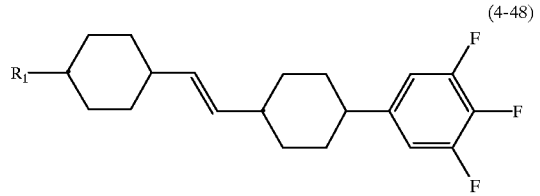
(5-1) to (5-14)
(5-1)
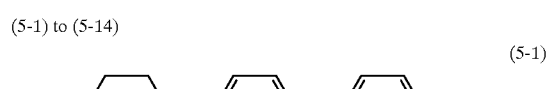
(5-2)
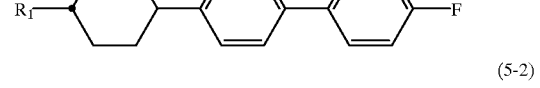
(5-3)
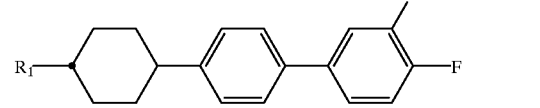
(5-4)
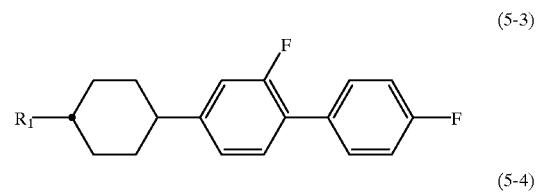
(5-5)
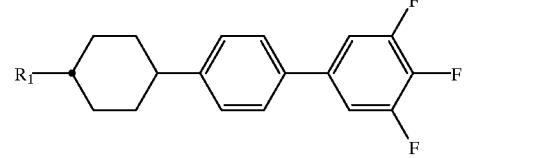
(5-6)
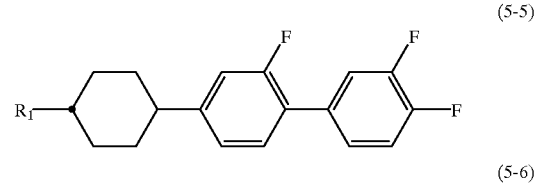
(5-7)
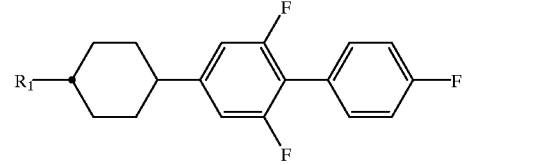

(5-8) 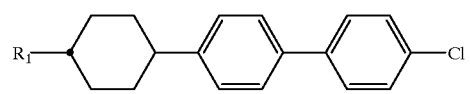
(5-9) 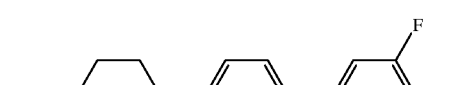
(5-10) 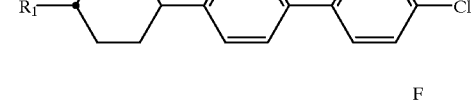
(5-11) 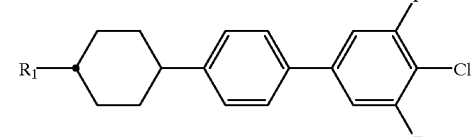
(5-12) 
(5-13) 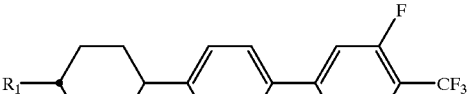
(5-14) 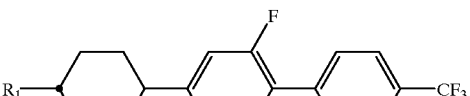
(5-15) to (5-28)
(5-15) 
(5-16) 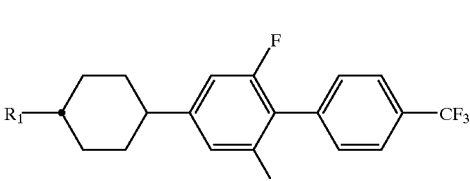
(5-17) 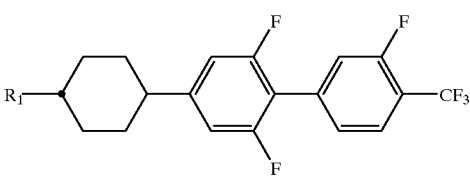
(5-18) 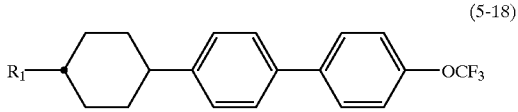
(5-19) 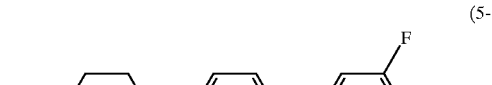
(5-20) 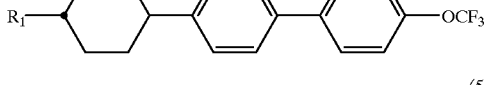
(5-21) 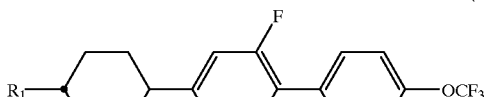
(5-22) 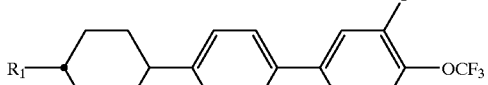
(5-23) 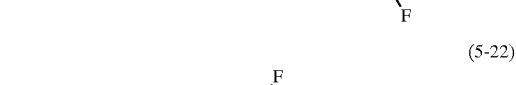
(5-24) 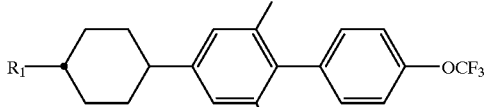
(5-25) 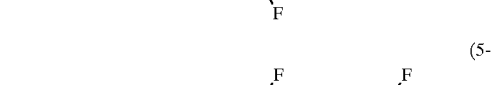
(5-26) 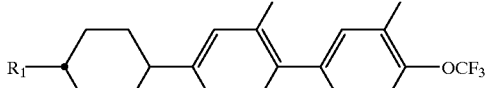
(5-27) 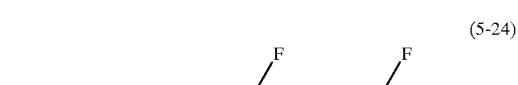

(5-28)
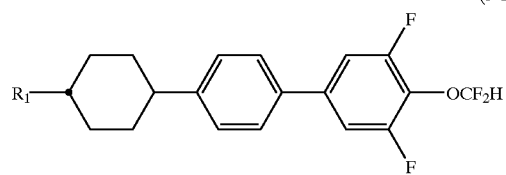
(5-29) to (5-41)
(5-29)
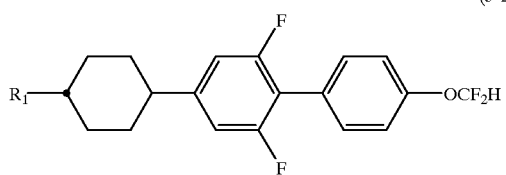
(5-30)
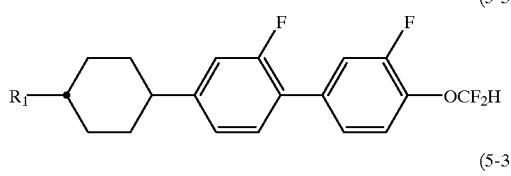
(5-31)
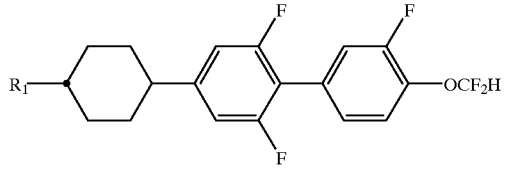
(5-32)
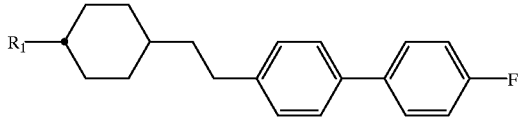
(5-33)
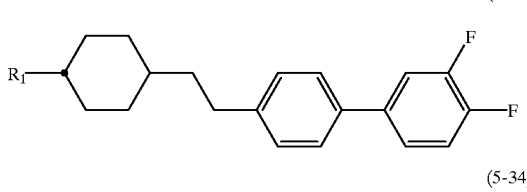
(5-34)
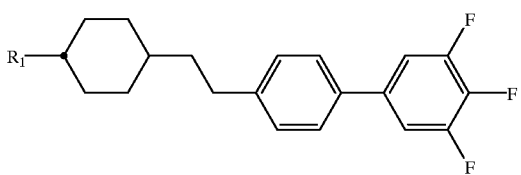
(5-35)
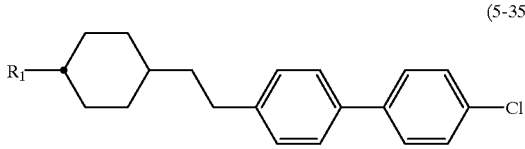
(5-36)
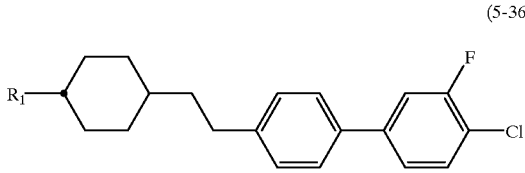
(5-37)
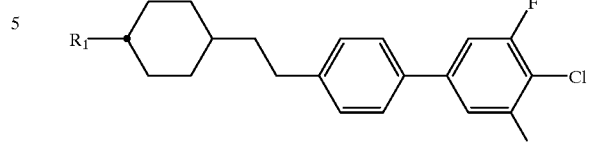
(5-38)
(5-39)
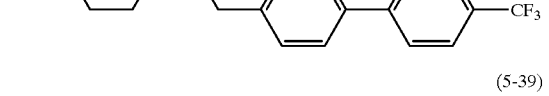
(5-40)
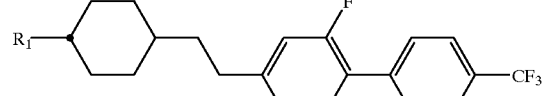
(5-41)
(5-42) to (5-53)
(5-42)
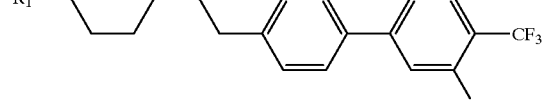
(5-43)
(5-44)
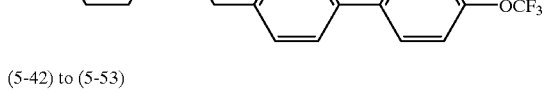
(5-45)
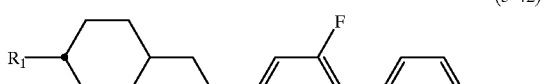

-continued (5-46)
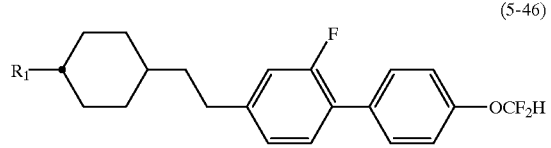

(5-47)
(5-48)
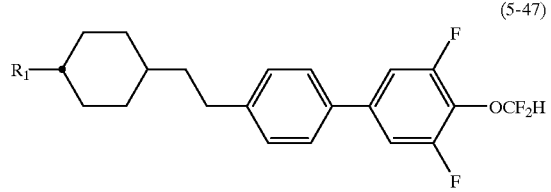

(5-49)
(5-50)
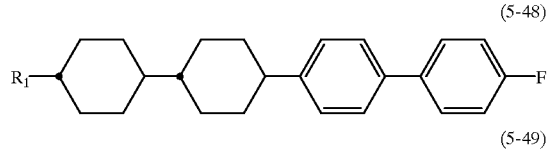

(5-51)
(5-52)
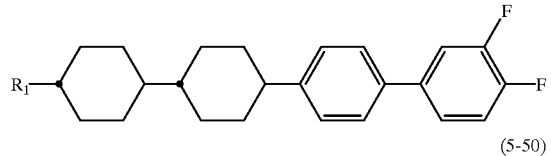

(5-53)
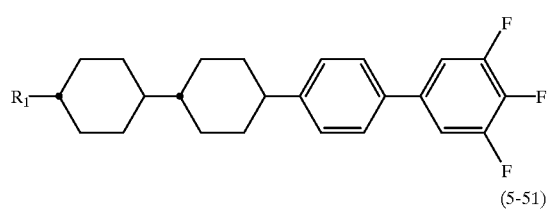

The compounds represented by the formulas [3] to [5] have positive anisotropic values and are excellent in thermal and chemical stability. In particular, they are compounds which are indispensable when preparing a liquid crystal composition for TFT to which high reliability such as a high voltage-holding rate and a large specific resistance is required.

Preferably, compounds represented by formulas (6-1) to (7-3) can be given as the compounds represented by the formulas [6] and [7]:

(6-1) to (6-17)

(6-1)
(6-2)
(6-3)
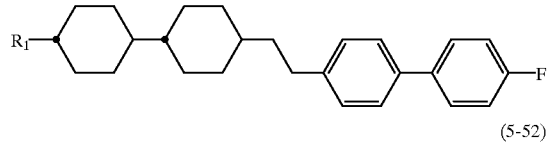

(6-4)
(6-5)
(6-6)
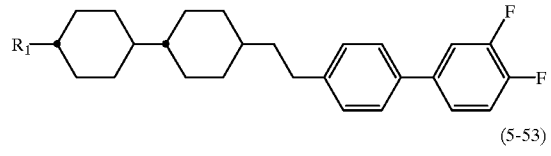

(6-7)
(6-8)
(6-9)
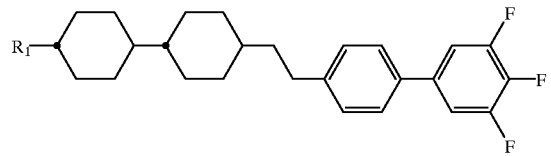

(6-10)

(6-11)
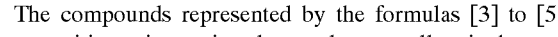

(6-12)
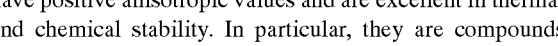

(6-13) 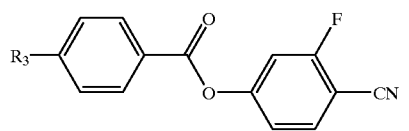

(6-14) 

(6-15) 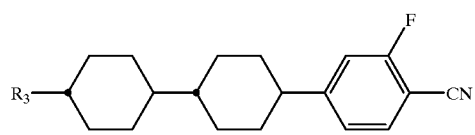

(6-16) 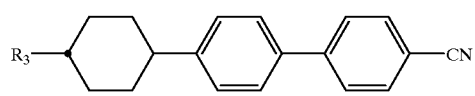

(6-17) 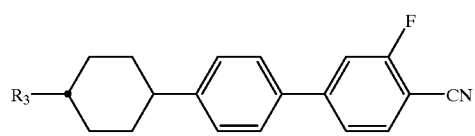

(6-18) 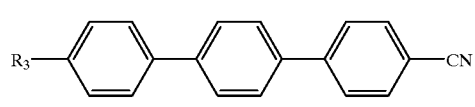

(6-19) 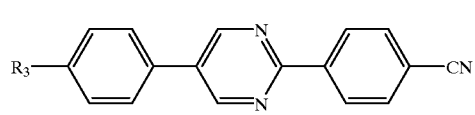

(6-20) 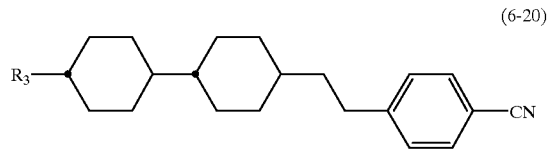

(6-21) 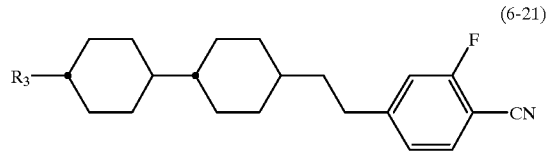

(6-22) 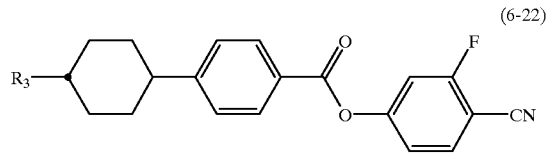

(6-23) 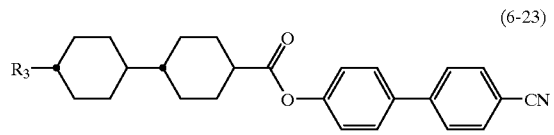

(6-18) to (7-3)

(6-24) 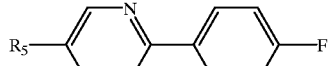

(7-1) 

(7-2) 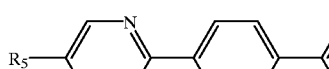

(7-3) 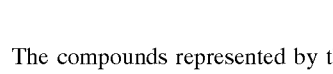

The compounds represented by the formulas [6] and [7] have positive dielectric constant anisotropy values, which are large, and they are used particularly for the purpose of reducing the threshold voltage. Further, they are used as well for adjusting the viscosity, controlling the refractive index anisotropy and expanding the nematic range such as elevating the clearing point. Furthermore, they are used as well for the purpose of improving the steepness of the threshold voltage.

Preferably, compounds represented by formulas (8-1) to (10-3) can be given as the compounds represented by the formulas [8] to [10]:

(8-1) to (10-3)

(8-1) 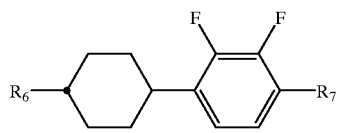

(8-2) 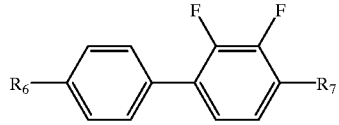

(8-3) 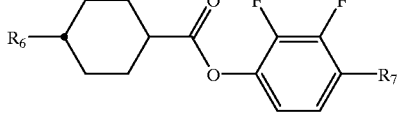

(9-1) 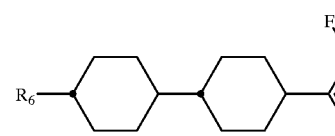

-continued

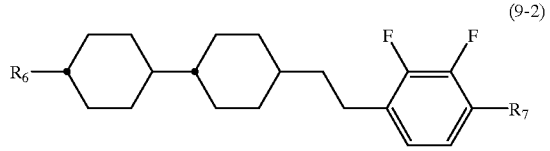
(9-2)

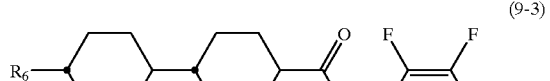
(9-3)

(9-4)

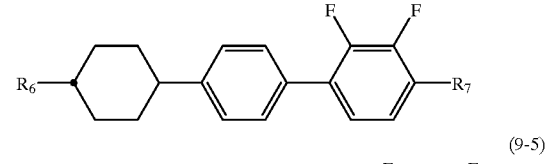
(9-5)

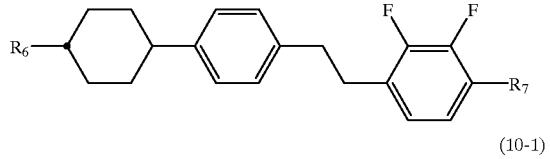
(10-1)

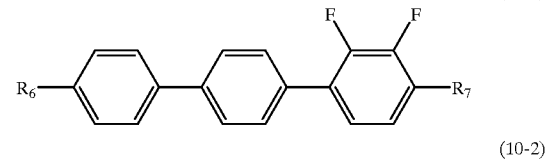
(10-2)

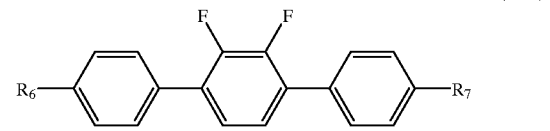
(10-3)

In the formulas, $R_6$ and $R_7$ are synonymous with those described above.

The compounds represented by the formulas [8] to [10] have negative dielectric constant anisotropy values. The compound represented by the formula [8] is a bicyclic compound and therefore used mainly for the purpose of controlling the threshold voltage, the viscosity and the refractive index anisotropy value. The compound represented by the formula [9] is used for the purposes of expanding the nematic range such as elevating the clearing point or controlling the refractive index anisotropy value. The compound represented by the formula [10] is used for the purpose of controlling the refractive index anisotropy value.

The compounds represented by the formulas [8] to [10] are used mainly for a liquid crystal composition having a negative refractive index anisotropy. If the amount of the compounds represented by the formulas [8] to [10] in the liquid crystal composition increases, the threshold voltage of the liquid crystal composition is reduced, and the viscosity thereof grows large. Accordingly, the use amount thereof is preferably small as long as a value required to the threshold voltage is satisfied. However, the refractive index anisotropy of the compounds represented by the formulas [8] to [10] has an absolute value of 5 or less, and therefore the amount of less than 40% by weight may make it impossible to carry out driving at a low voltage in a certain case.

When preparing the composition for TFT having negative dielectric anisotropy, the compounds represented by the formulas [8] to [10] are used preferably in a range of 40% by weight or more, more preferably 50 to 95 by weight based on the whole weight of the liquid crystal composition.

The compounds represented by the formulas [8] to [10] are added to the composition having a positive dielectric anisotropy value in a certain case for the purpose of improving the steepness of a voltage-transmittance curve by controlling the elastic constant. In this case, the compounds represented by the formulas [8] to [10] are contained in the liquid crystal composition preferably in an amount of 30% by weight or less.

Preferably, compounds represented by formulas (11-1) to (13-13) can be given as the compounds represented by the formulas [11] to [13]:

(11-1) to (11-14)

(11-1)

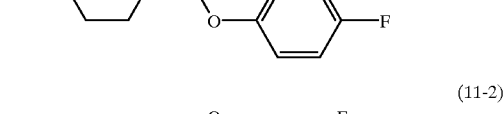
(11-2)

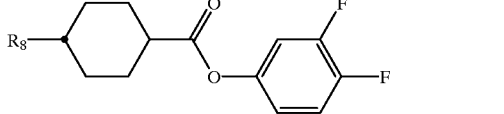
(11-3)

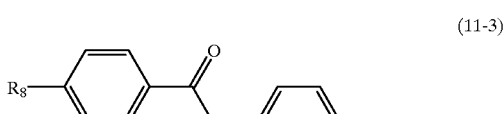
(11-4)

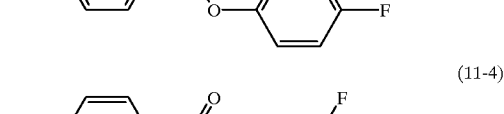
(11-5)

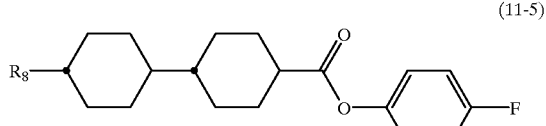
(11-6)

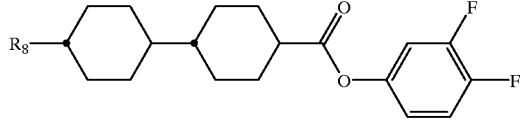

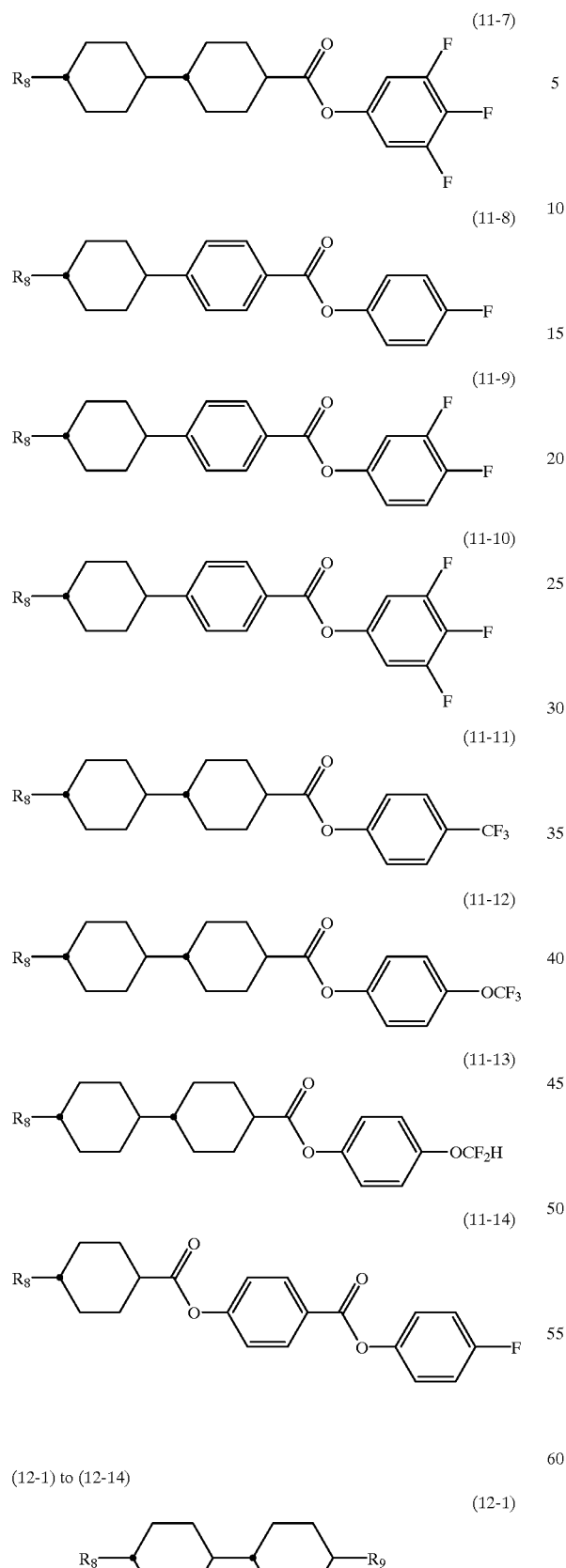
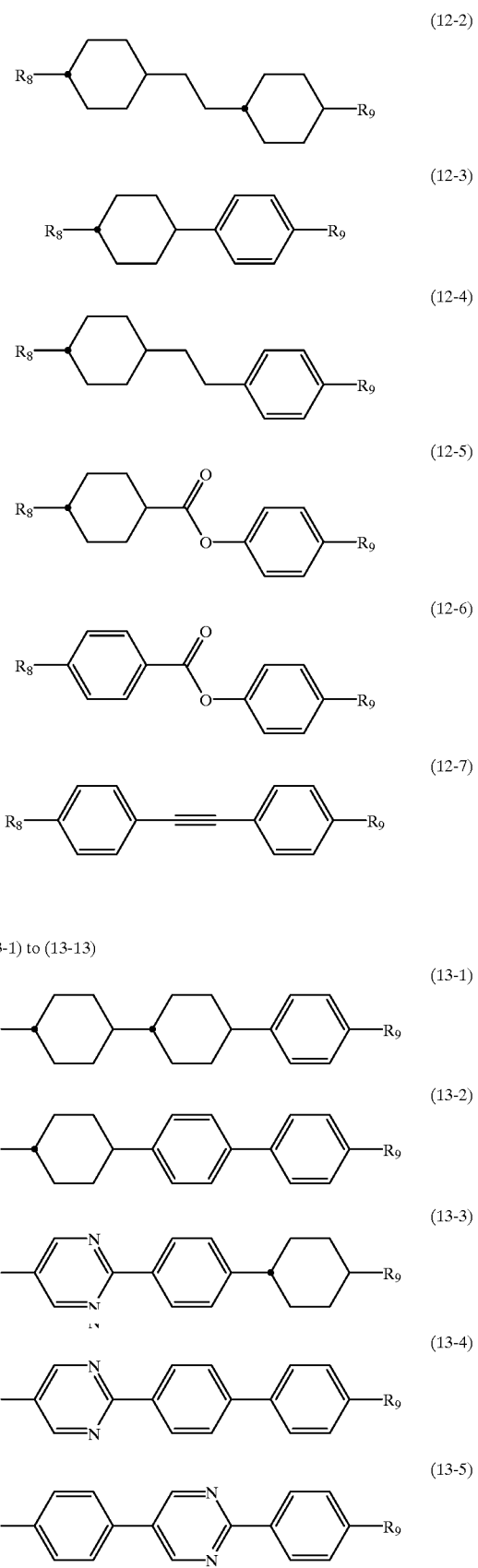

-continued

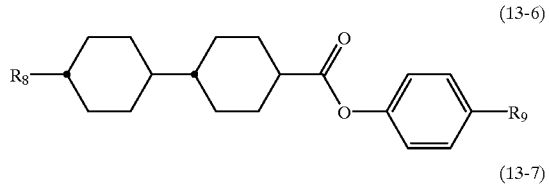
(13-6)

(13-7)

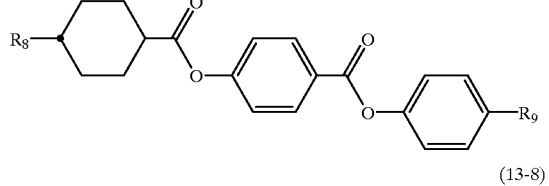
(13-8)

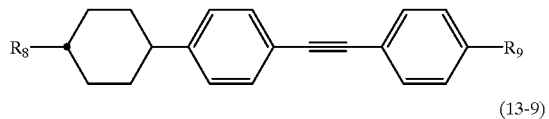
(13-9)

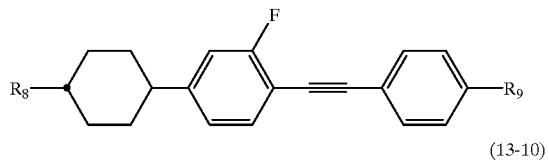
(13-10)

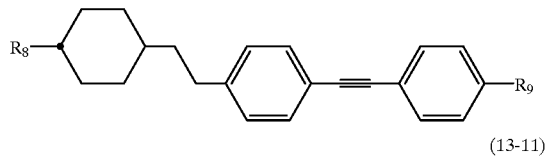
(13-11)

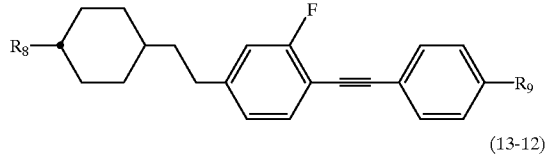
(13-12)

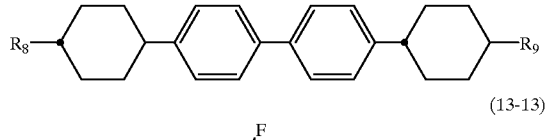
(13-13)

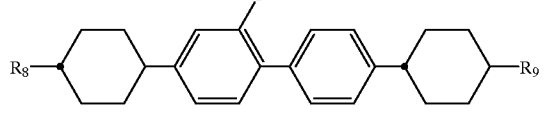

The compounds represented by the formulas [11] to [13] have negative or weak positive dielectric anisotropy values. The compound represented by the formula [11] is used mainly for the purpose of reducing the viscosity or controlling the refractive index anisotropy value. The compound represented by the formula [13] is used for the purposes of expanding the nematic range such as elevating the clearing point or controlling the refractive index anisotropy value.

The liquid crystal display element of the present invention is usually composed of a substrate, a voltage-applying means, a liquid crystal aligning film and a liquid crystal layer. It is characterized by being provided with an aligning film which has a high sensitivity and is quickly optically dimerized and which is excellent in heat stability and shape-holding ability after cross-linking and has good liquid crystal orientation, that is, the aligning film for a liquid crystal display element according to the present invention.

The UV-rays dimerizable high molecular compounds of the present invention can be used for various protective layers and insulating layers in addition to an aligning film.

EXAMPLES

The present invention shall be explained below in further details with reference to examples, but the present invention shall by no means be restricted by these examples.

Next, the physical properties of the photo-sensitive high molecular compounds obtained in the examples were. determined by the following methods:

Melting point:

A hot stage (FP-82 manufactured by Metler Co., Ltd.) was installed in a polarization microscope, and a melting point was measured at a heating speed of 5° C./minute.

Nuclear magnetic resonance spectrum (NMR):

A NMR spectrum was measured by means of EX-90A manufactured by Japan Electron Co., Ltd. using tetramethylsilane for an internal standard reference material.

Rotational viscosity:

Measured at 25° C. by means of an E type viscometer.

Example 1

1) Production of the photo-sensitive high molecular compound represented by the formula [2]:

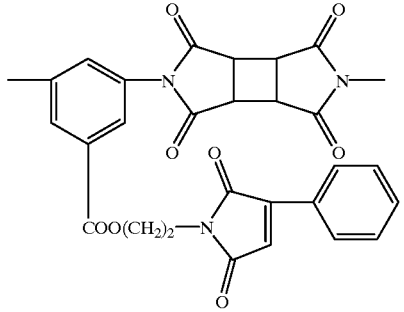

A three neck flask of 1 l equipped with a dropping funnel and a stirrer was charged with 11.1 g of N-(2-hydroxyethyl)-α-phenylmaleimide and 500 ml of dioxane, and 7.70 ml of triethylamine was added while stirring at 0° C. A dioxane solution of 11.5 g of 3,5-dinitrobenzoyl chloride was dropwise added thereto at 0° C., and the mixture was stirred at a room temperature all the night through. After finishing the reaction, the reaction solution was added to 1 l of water to filter the resulting crystal. This was recrystallized in ethyl acetate twice to obtain 6.10 g of N-(2-(3, 5-dinitrobenzoyl) oxyethyl)-α-phenylmaleimide. This compound was subjected to reduction of a nitro group without refining furthermore. This compound had a melting point of 179.1 to 180.7° C.

A three neck flask of 300 ml equipped with a dropping funnel and a stirrer was charged with 8.22 g of N-(2-(3,5-dinitrobenzoyl)oxyethyl)-α-phenylmaleimide and 150 ml of dioxane, and 30.2 g of stannous chloride (dihydrate) was added thereto while stirring at a room temperature. Dropwise added thereto was 30.2 g of conc. hydrochloric acid at 10° C., and after adding, the mixture was stirred at a room temperature for 3 hours. After finishing the reaction, a 2 N sodium hydroxide aqueous solution was dropwise added to neutralization to filter the reaction solution with cerite. The filtrate was extracted with ethyl acetate twice, and the organic phase was washed with water three times. Then, it was dried on magnesium sulfate anhydrous. After filtering the desiccating agent off, the solution was concentrated under reduced pressure to obtain a yellow solid material. This was recrystallized in ethyl acetate twice to obtain 6.42 g of N-(2-(3,5-diaminobenzoyl)oxyethyl)-α- phenylmaleimide. This compound had a melting point and an NMR spectrum shown below:

Melting point: 182 to 184° C.

$^1$H-NMR (90 MHz, DMSO-d6):δ 3.82 (t, 2H), 4.39 (t, 2H), 4.90 (bs, 4H), 6.04 (t, 1H), 6.40 (d, 2H), 7.27 (s, 1H), 7.50 to 8.09 (m, 5H)

2) Polymerization reaction:

A three neck flask of 100 ml was charged with 3.514 g of N-(2-(3,5-diaminobenzoyl)oxyethyl)-α-phenylmaleimide and 31.0 g of NMP to stir them at a room temperature under nitrogen flow to dissolve them. Then, the reaction solution was maintained at 10° C., and 1.961 g of 1,2,3,4-cyclobutanetetracarboxylic dihydride was put therein to carry out the reaction at a room temperature for 6 hours, whereby a polymer solution of 15.0 wt % was obtained. In this case, the viscosity was 114 mP·s, and the weight-average molecular weight (Mw) was 93200.

3) Formation (photo-dimerization) of aligning film for liquid crystal display element represented by the formula [1]:

The polyamic acid solution obtained in 2) was diluted to 5.0 wt % by an NMP/butyl cellosolve=1:1 solution, and this was filtered with a filter of 0.1 μm to obtain a solution for a liquid crystal aligning material. Then, it was applied on an ITO glass substrate by a rotational applying method (spinner method). After applying, it was baked at 230° C. for 60 minutes to form a thin film having a film thickness of 740 angstrom. The surface of the thin film was irradiated with 2.0 J/cm² of linearly polarized UV-rays having a wavelength of about 365 nm from an extra-high pressure mercury lamp.

4) Preparation of liquid crystal cell and evaluation of orientation:

The substrates obtained in 3) were stuck together in order that polarized direction of UV-rays become parallel and a cell was prepared that thickness of the liquid crystal layer is 20 μm. Then, a liquid crystal composition of jc-5006 manufactured by Chisso Corporation was injected into the cell and cooled after heating it at 110° C. for 30 minutes. The orientation of the liquid crystal was confirmed to find that it was good.

Example 2

The same procedure as in Example 1 was repeated except that the photo-sensitive high molecular compound represented by the formula [2] had a structure represented by:

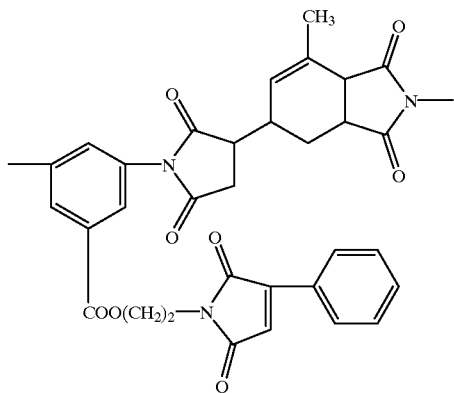

and the good liquid crystal orientation was confirmed.

Example 3

The same polyamide acid as used in Example 1 was used to prepare a liquid crystal cell according to Example 1, except that the liquid crystal composition used for TFT was changed from (LA) up to (LE), and the good liquid crystal orientation was confirmed. The respective compositions of the liquid crystal compositions (LA) to (LE) used here are shown below:

Liquid crystal composition (LA)

10%
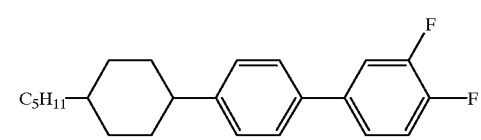
3%
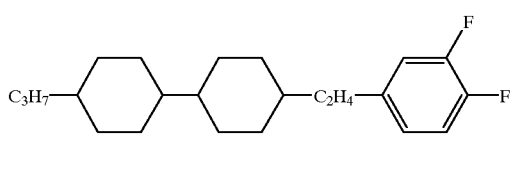
3%
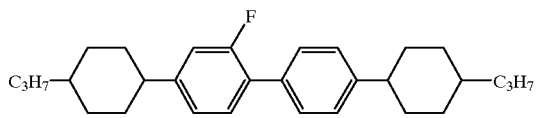
3%
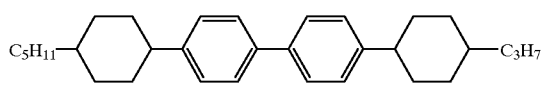
4%
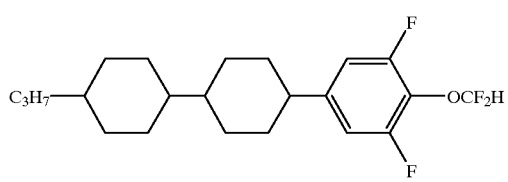
Liquid crystal composition (LB)
7%
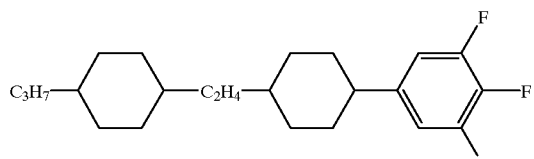
8%
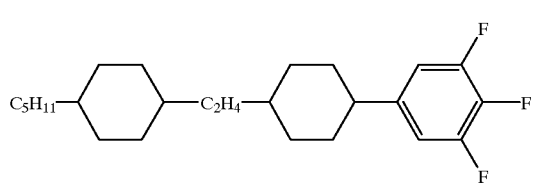
10%
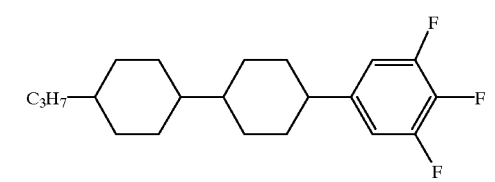
5%
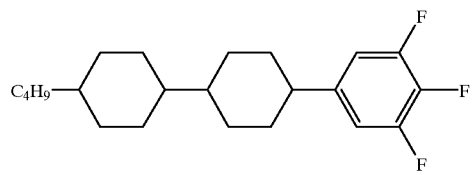
9%
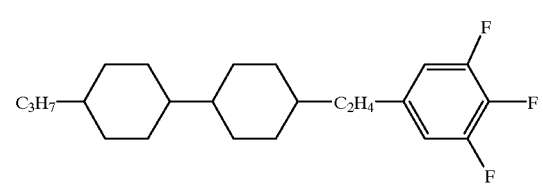
9%
15%
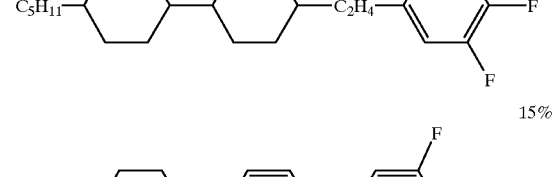
15%
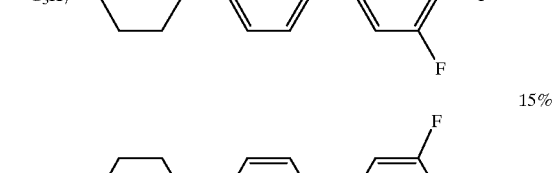
2%
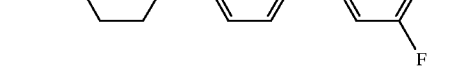
2%
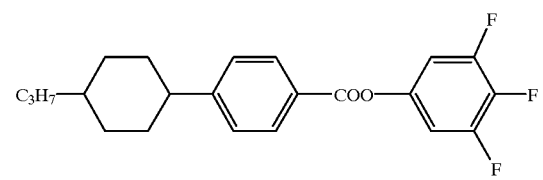
2%
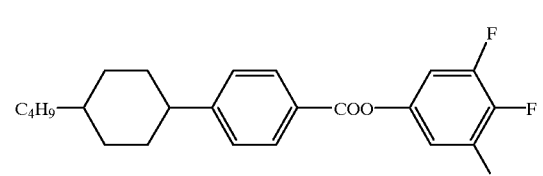

39
-continued
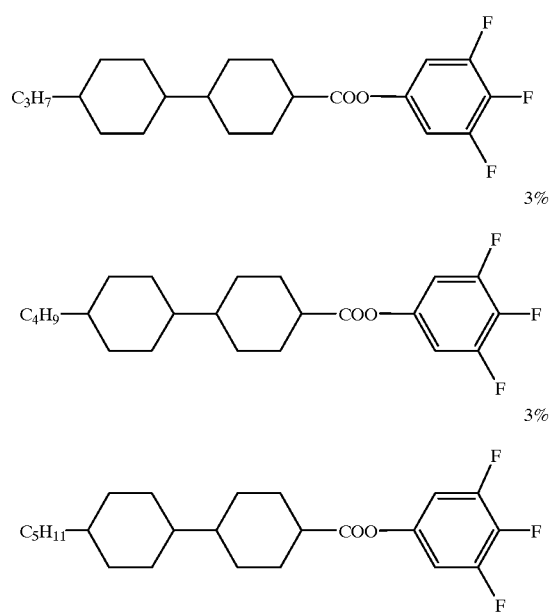
Liquid crystal composition (LC)
40
-continued
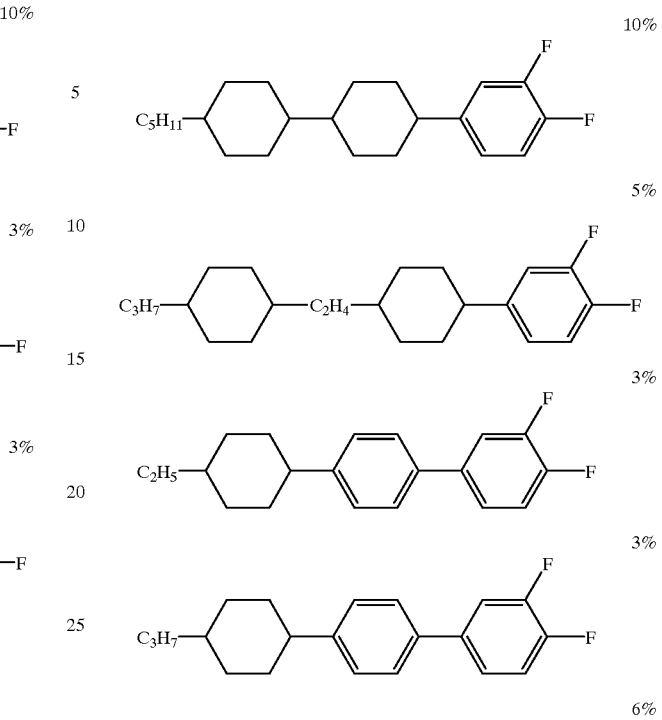
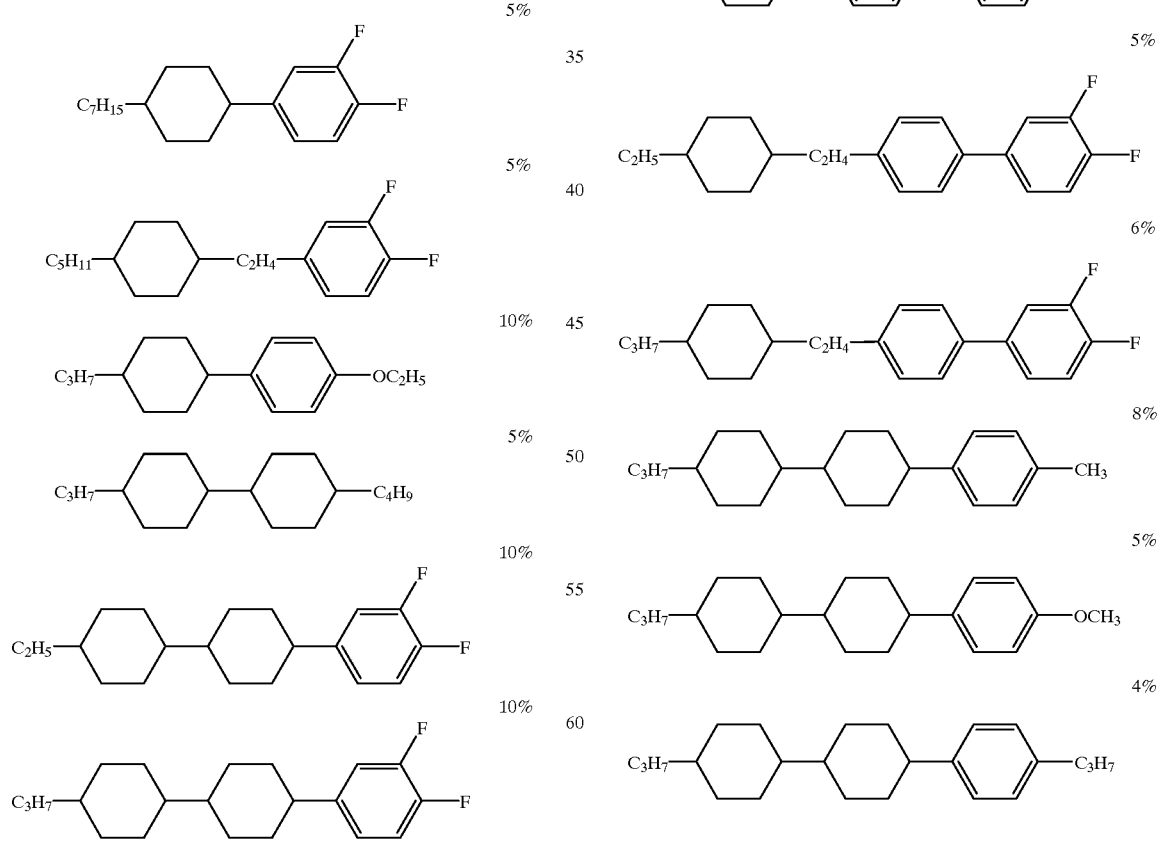

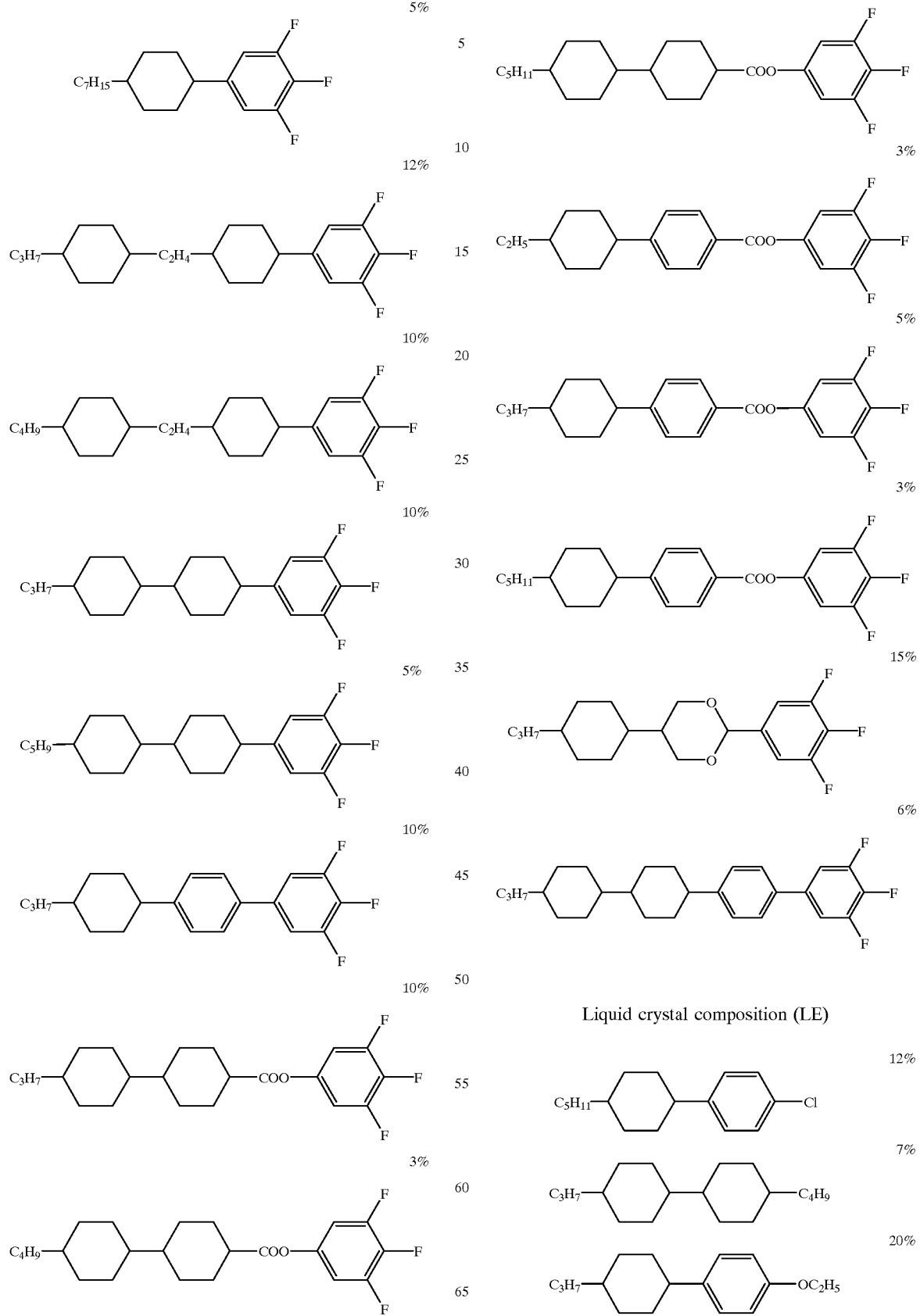

8%

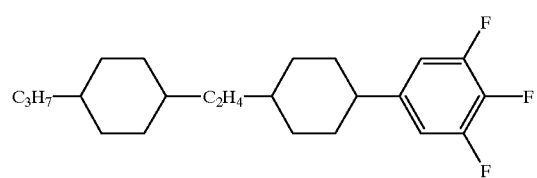

8%

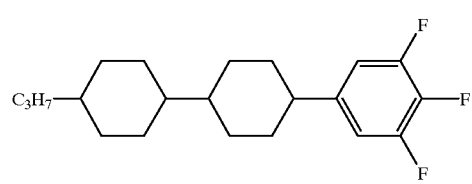

6%

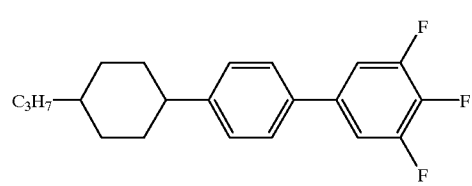

5%

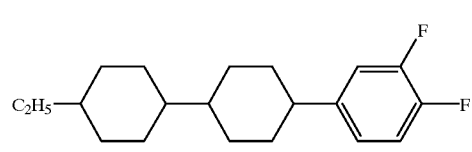

5%

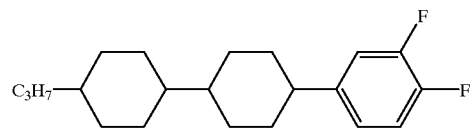

5%

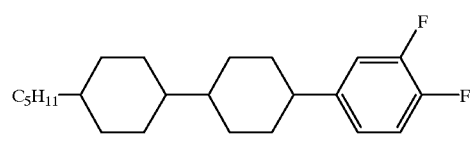

2%

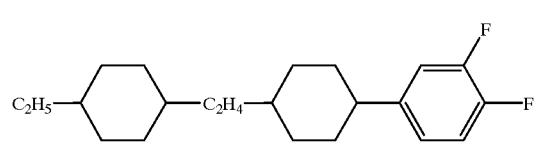

1%

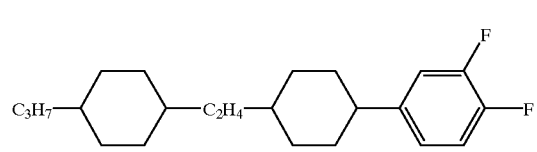

2%

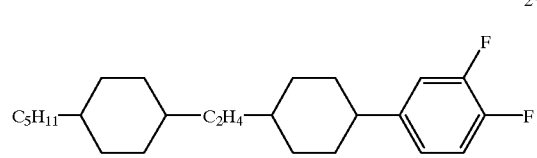

4%

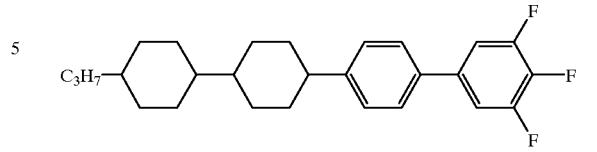

4%

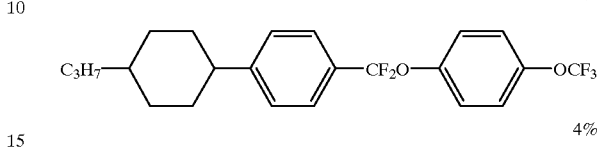

4%

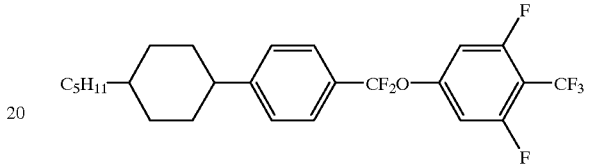

3%

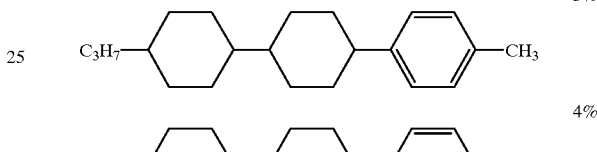

4%

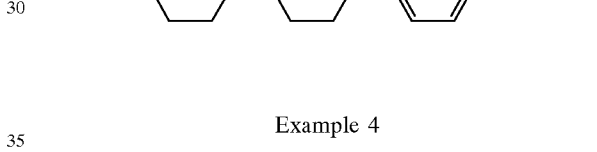

Example 4

The same polyamide acid as used in Example 1 was used to prepare a liquid crystal cell according to Example 1, except that the liquid crystal composition used for STN was changed from (LF) up to (LK), and the good liquid crystal orientation was confirmed. The respective compositions of the liquid crystal compositions (LF) to (LK) used here are shown below:

Liquid crystal composition (LF)

10%

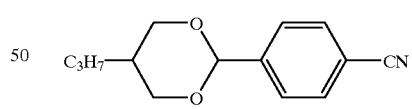

10%

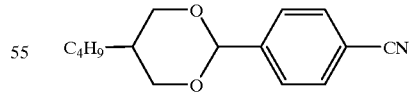

12%

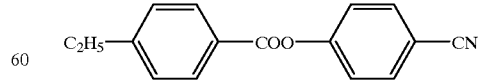

4%

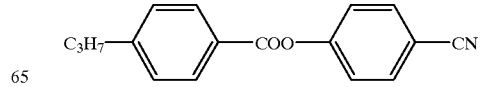

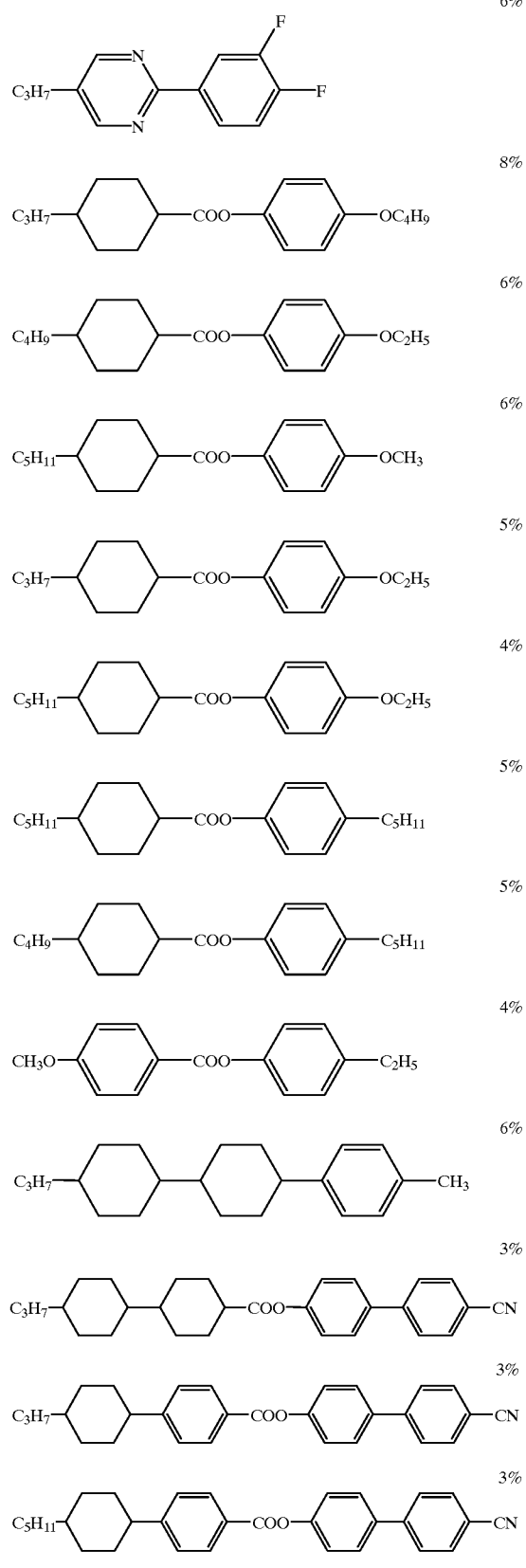
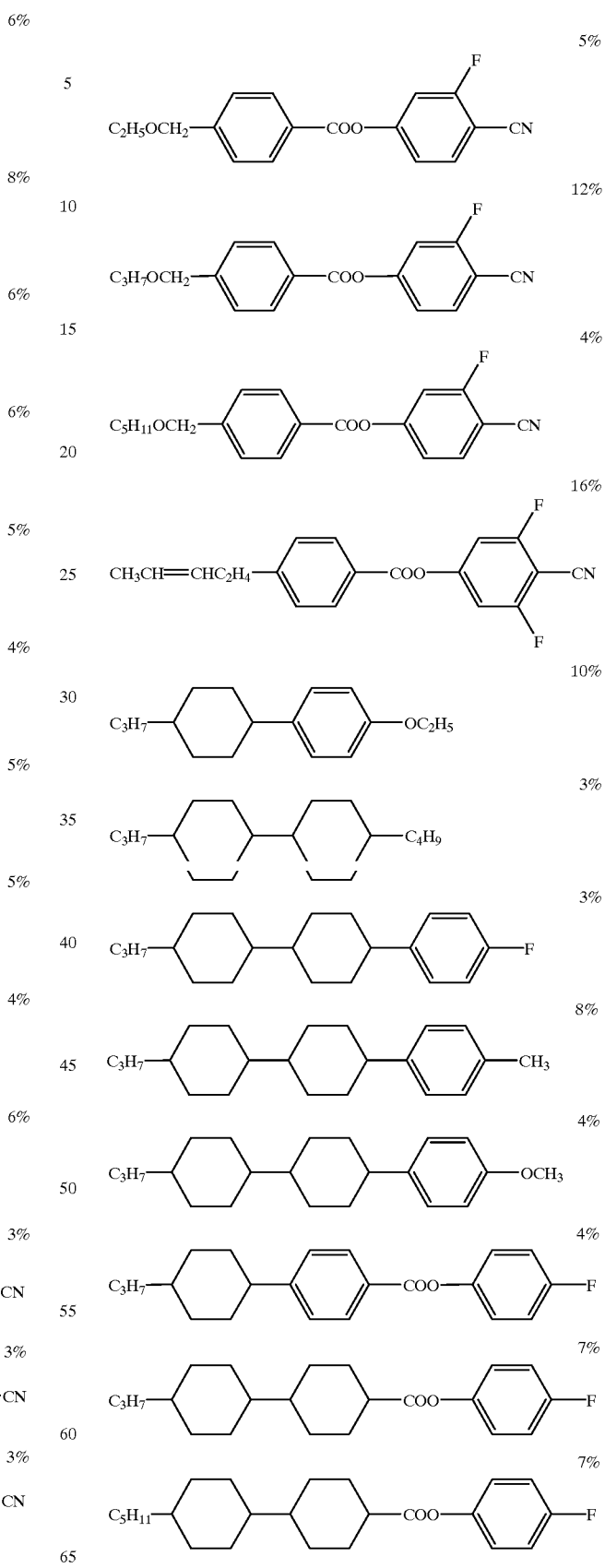
Liquid crystal composition (LG)

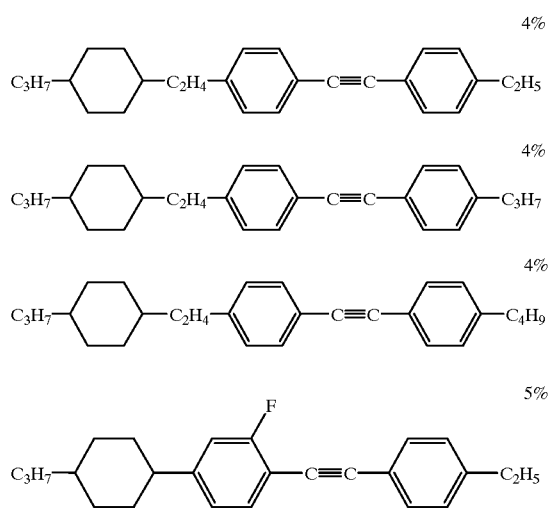
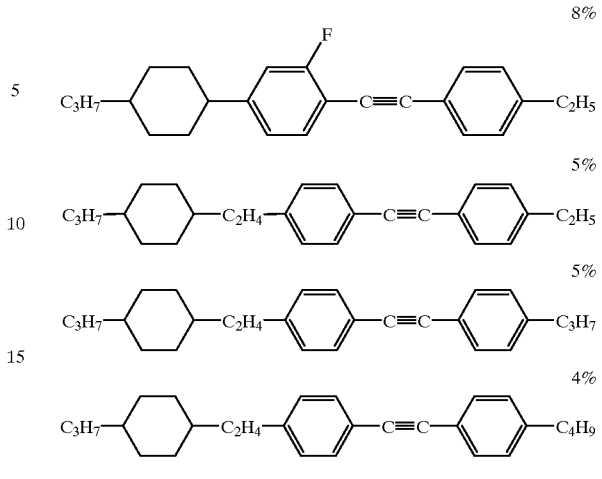
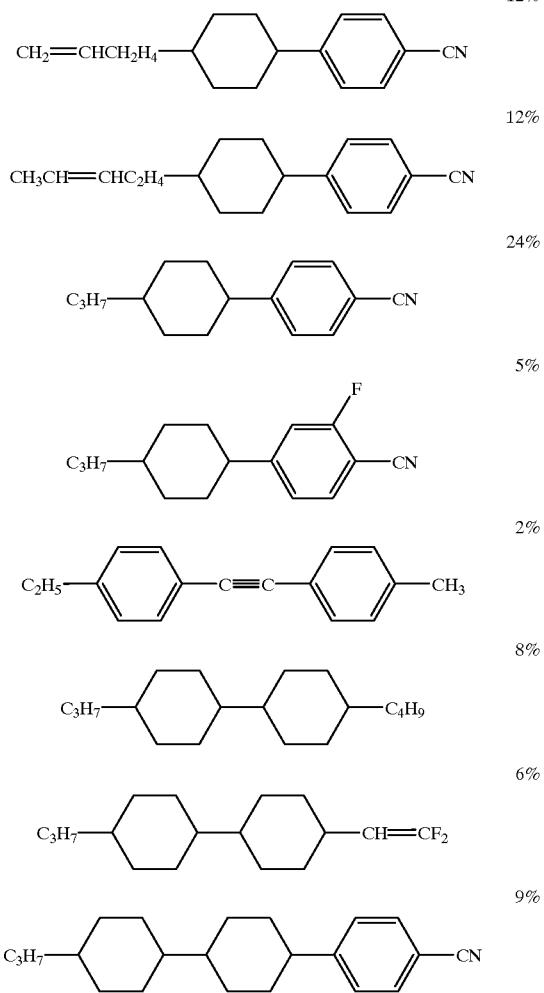
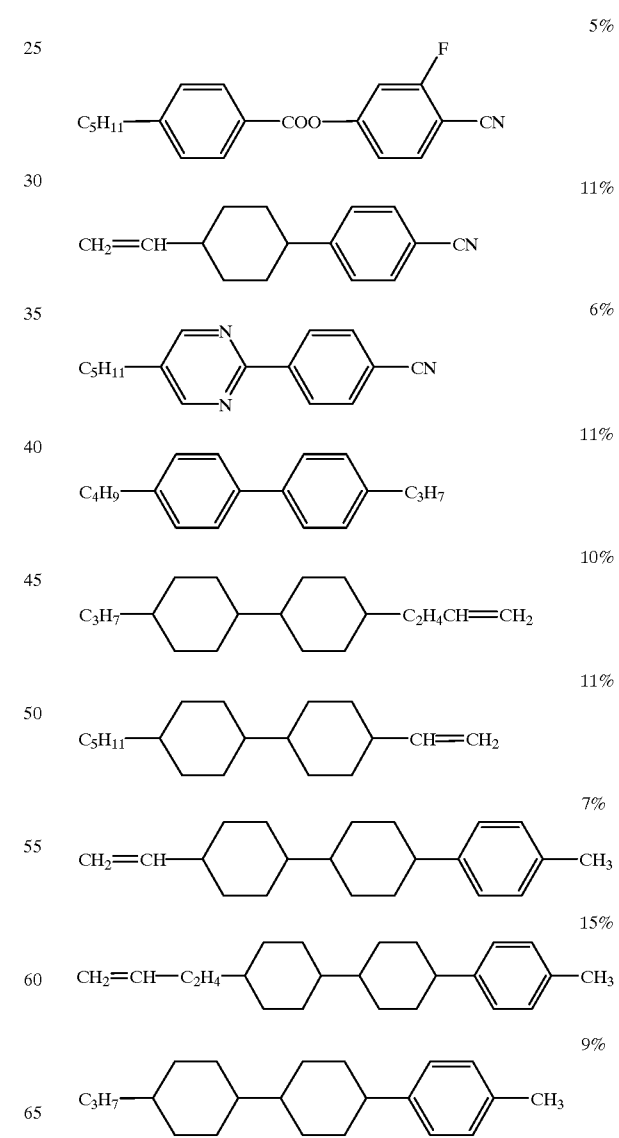

-continued

CH₃CH=CHC₂H₄—[Cy]—[Cy]—[Ph]—C₂H₅    10%

C₃H₇—[Cy]—[Cy]—COO—[Ph]—[Cy]—C₃H₇    5%

Liquid crystal composition (LJ)

CH₃CH=CHC₂H₄—[Ph]—COO—[Ph(F,F)]—CN    6%

C₃H₇—[Cy]—[Ph]—CN    18%

C₂H₅—[Ph]—C≡C—[Ph]—CH₃    10%

C₂H₅—[Cy]—[Cy]—CH=CF₂    30%

CF₂=CH—[Cy]—[Cy]—[Ph]—CH₃    8%

CF₂=CHC₂H₄—[Cy]—[Cy]—[Ph]—CH₃    11%

C₃H₇—[Cy]—C₂H₄—[Ph]—C≡C—[Ph]—C₂H₅    5%

C₃H₇—[Cy]—C₂H₄—[Ph]—C≡C—[Ph]—C₃H₇    4%

C₃H₇—[Cy]—C₂H₄—[Ph]—C≡C—[Ph]—C₄H₉    4%

C₃H₇—[Cy]—[Cy]—[Ph]—CH₃    4%

Liquid crystal composition (LK)

C₃H₇—[Cy]—[Ph]—CN    18%

C₇H₁₅—[Cy]—[Ph]—CN    3%

CH₃OCH₂—[Cy]—[Ph]—CN    10%

C₃H₇—[Cy]—[Ph(F)]—CN    10%

C₂H₅—[Pyrimidine]—[Ph]—C₂H₅    2%

C₃H₇—[Pyrimidine]—[Ph]—C₂H₅    2%

C₄H₉—[Pyrimidine]—[Ph]—C₂H₅    2%

CH₃OCH₂—[Cy]—[Cy]—C₃H₇    7%

C₂H₅—[Ph]—C≡C—[Ph]—OCH₃    7%

C₃H₇—[Cy]—[Cy]—[Ph]—CH₃    7%

C₃H₇—[Cy]—[Cy]—[Ph]—F    4%

C₃H₇—[Cy]—[Cy]—[Ph]—OCH₃    4%

C₃H₇—[Cy]—[Cy]—[Ph]—C₃H₇    8%

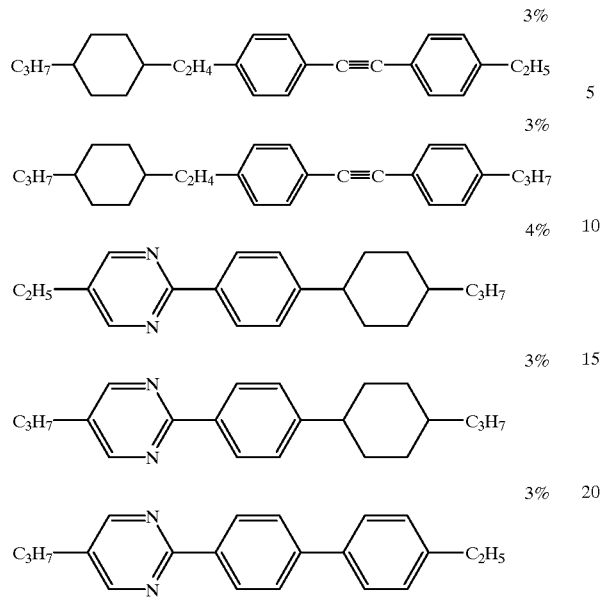

Comparative Example 1

The same procedure as in Example 1 was repeated except that polyimide represented by:

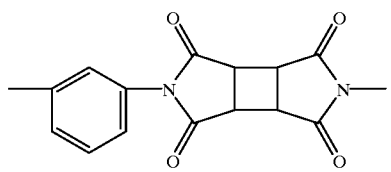

was substituted for the photo-sensitive high molecular compound represented by the formula [2], and the liquid crystal orientation was not observed at all.

INDUSTRIAL APPLICABILITY

The high molecular compound having an α, β-substituted maleimide residue on a side position obtained according to the present invention has a high sensitivity and is quickly optically dimerized at a side position to form a cyclobutane ring. The film obtained after dimerization is excellent in heat stability and shape-holding ability and particularly useful as an optically aligning film which shows good liquid crystal orientation.

What is claimed is:

1. A high molecular compound having a structure represented by a formula [1];

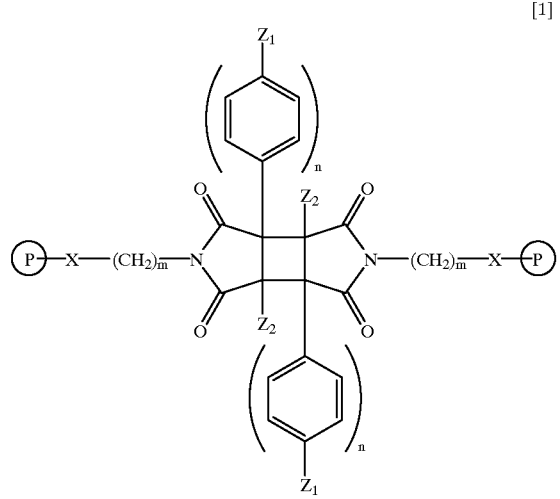

wherein respective P's represent independently a high molecular chain having a weight-average molecular weight of 1,000 to 500,000; respective X's represent independently a single bond, —COO—, —OCO—, —NHCO—, —CONH—, —O—, —S— and —CO—; respective $Z_1$'s and $Z_2$'s represent independently a hydrogen atom, a fluorine atom, a chlorine atom, a cyano group, a nitro group, an alkyl group, a haloalkyl group, an alkoxy group or a haloalkoxy group each having 1 to 12 carbon atoms, a cycloalkyl group having 3 to 9 carbon atoms or a trans-4-alkylcyclohexyl group having 7 to 11 carbon atoms; m is an integer of 1 to 20; and n is an integer of 0 to 3.

2. A high molecular compound having a structure represented by a formula [2];

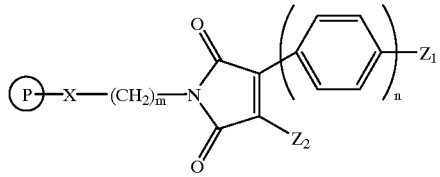

wherein P represents a high molecular chain having a weight-average molecular weight of 1,000 to 500,000; X represents a single bond, —COO—, —OCO—, —NHCO—, —CONH—, —O—, —S— and —CO—; $Z_1^1$ and $Z_2$ represent independently a hydrogen atom, a fluorine atom, a chlorine atom, a cyano group, a nitro group, an alkyl group, a haloalkyl group, an alkoxy group or a haloalkoxy group each having 1 to 12 carbon atoms, a cycloalkyl group having 3 to 9 carbon atoms or a trans-4-alkylcyclohexyl group having 7 to 11 carbon atoms; m is an integer of 1 to 20; and n is an integer of 0 to 3.

* * * * *

UNITED STATES PATENT AND TRADEMARK OFFICE
CERTIFICATE OF CORRECTION

PATENT NO. : 6,090,909
DATED : July 18, 2000
INVENTOR(S) : Takashi Kato et al.

Page 1 of 1

It is certified that error appears in the above-identified patent and that said Letters Patent is hereby corrected as shown below:

Column 52, claim 2,
Line 49, replace "$Z_1^1$" with -- $Z_1$ --.

Signed and Sealed this

Thirteenth Day of November, 2001

Attest:

*Attesting Officer*

NICHOLAS P. GODICI
*Acting Director of the United States Patent and Trademark Office*